(12) United States Patent
Kurosu

(10) Patent No.: US 10,877,405 B2
(45) Date of Patent: Dec. 29, 2020

(54) IMAGE FORMING APPARATUS

(71) Applicant: CANON KABUSHIKI KAISHA, Tokyo (JP)

(72) Inventor: Toshiyuki Kurosu, Bando (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/803,560

(22) Filed: Feb. 27, 2020

(65) Prior Publication Data
US 2020/0278624 A1 Sep. 3, 2020

(30) Foreign Application Priority Data

Feb. 28, 2019 (JP) .................................. 2019-036935

(51) Int. Cl.
*G03G 15/16* (2006.01)
*H04N 1/29* (2006.01)

(52) U.S. Cl.
CPC ....... *G03G 15/1615* (2013.01); *G03G 15/161* (2013.01); *H04N 1/29* (2013.01)

(58) Field of Classification Search
CPC ............. G03G 15/1605; G03G 15/161; G03G 15/1615
See application file for complete search history.

(56) References Cited

U.S. PATENT DOCUMENTS

| 5,070,366 A * | 12/1991 | Tsuchiya ............ G03G 15/0216 399/162 |
| 8,588,641 B2 * | 11/2013 | Mimbu .............. G03G 15/1645 399/121 |
| 9,037,042 B2 | 5/2015 | Kato et al. |
| 2009/0317108 A1 * | 12/2009 | Taki .................... G03G 15/1605 399/66 |
| 2018/0224779 A1 | 8/2018 | Tomita et al. |

FOREIGN PATENT DOCUMENTS

| JP | 2008-134446 A | 6/2008 |
| JP | 2017-068288 A | 4/2017 |
| JP | 2018-123951 A | 8/2018 |

* cited by examiner

*Primary Examiner* — Erika J Villaluna
(74) *Attorney, Agent, or Firm* — Venable LLP

(57) ABSTRACT

An image forming apparatus includes a rotatable toner carrying member; a rotatable transfer member contactable to the image carrying member to transfer a toner image from the image carrying member onto a sheet; an urging member for urging the transfer member toward the image carrying member; a supporting member supporting the transfer member so as to be movable toward and away from the carrying member; a driving source for rotating the transfer member; and a coupling member provided opposed to the transfer member in an axial direction of the transfer member to engage with the transfer member to transfer a driving force from the driving source to the transfer member.

8 Claims, 14 Drawing Sheets

(a)　　　　　　　　　　　(b)

IMAGE FORMING APPARATUS

FIELD OF THE INVENTION AND RELATED ART

The present invention relates to an image forming apparatus such as a copying machine, a printer, a facsimileing machine, which uses an electrophotographic method or an electrostatic recording method. It relates to also a multifunction image forming machine which has two or more functions of the preceding image forming apparatuses.

Generally speaking, in an image forming apparatus which uses an electrophotographic method or the like, a toner image formed on an image bearing member such as a photosensitive member, an intermediary transferring member, or the like is transferred onto a sheet of recording medium such as paper, by a transferring means. Also, generally speaking, as a transferring means, a transfer roller is used. A transfer roller is a transferring member which is in the form of a roller. It forms a transferring portion (transfer nip) by being placed in contact with the peripheral surface of an image bearing member. Next, the image forming operation of an electrophotographic method or an electrostatic method is further described with reference to an image forming apparatus of the so-called intermediary transfer type, that is, an image forming apparatus which forms a toner image on its photosensitive drum as the first image bearing member, transfers (primary transfer) the toner image onto its intermediary transfer belt as the second image bearing member, and transfers the toner image on the intermediary transfer belt onto a sheet of recording medium with the use of its secondary transfer roller as the secondary transferring member, in its secondary transferring portion.

There are two methods for driving a secondary transferring member. One is an indirect driving method which drives the secondary transfer roller by way of an intermediary transfer belt. The other is a direct driving method which directly inputs driving force into a secondary transfer roller. An indirect method does not require a structural arrangement for driving a secondary transfer roller. Therefore, it is meritorious from the standpoint of cost reduction and spatial efficiency. However, in the case of an indirect driving method, during the secondary transfer, a secondary transfer roller is rotated by an intermediary transfer belt, with the presence of a sheet of recording medium between the secondary transfer roller and intermediary transfer belt. Therefore, it is possible that the speed at which a sheet of recording medium is conveyed through the secondary transferring portion will be affected by the density at which an image is formed, or the like factor. Further, in recent years, demand has been increasing for the formation of a high quality image on a sheet of highly rigid cardstock. Thus, in order to keep an image forming apparatus stable in recording medium conveyance through the secondary transferring portion, a direct driving method which directly drives a secondary transfer roller is used in some cases.

Further, as a method for positioning a secondary transfer roller, there is a method for regulating a secondary transfer roller in its position (position regulating method). A position regulating method is meritorious in that it can simplify an image forming apparatus in structure. However, in the case of a position regulating method, a secondary transfer roller is fixed in position relative to an intermediary transfer belt, and therefore, the fixation nip is fixed in position. Therefore, the secondary transfer is likely to be affected by the thickness of a sheet of recording medium, and/or the amount of frictional wear of a secondary transfer roller. Therefore, as the method for positioning a secondary transfer roller, a pressure regulating method for controlling the amount of pressure by which a secondary transfer roller is pressed upon an intermediary transfer belt is desirable, from the standpoint of preventing the problem that the pressure of the secondary transferring portion is affected by the thickness of a sheet of recording medium, amount of frictional wear of a secondary transfer roller, and/or the like factors.

In Japanese Laid-open Patent Application No. 2017-68288, the following structural arrangement is proposed for an image forming apparatus structured so that its secondary transfer roller which can be moved toward, or away from, its intermediary transfer belt, is kept pressed toward the intermediary transfer belt. More specifically, the secondary transfer roller is attached to a frame which is pivotally movable about its supporting shaft, and is kept pressed toward the intermediary transfer belt by springs. Further, the force for driving the secondary transfer roller is inputted into a driver gear which is coaxially supported by this supporting shaft, and then, is transmitted to a driver gear fixed to end portion of the axle of the secondary transfer roller by way of an idler gear, in order to rotationally drive the secondary transfer roller.

However, in a case where a pressure regulating method is employed, if an image forming apparatus is structured so that driving force is transmitted to the driving gear fixed to one of the lengthwise end portions of the axle of the secondary transfer roller, the following phenomenon will occur. That is, it is possible that as driving force is inputted into the driving gear, the pressure to which the secondary transferring portion is subjected will change, and therefore, the driver gear's side of the secondary transferring portion, from which the secondary transfer roller is driven, and the opposite side of the secondary transferring portion from the side from which it is driven, will become unbalanced in the pressure of the secondary transfer portion. This phenomenon tends to be conspicuous when an image is formed on a sheet of highly rigid cardstock, which is likely to increase the amount of load to which the secondary transferring portion is subjected as the secondary transfer roller is driven, Next, this phenomenon is described further.

FIG. 14 is a schematic drawing of the conventional mechanism, such as the one described above, for driving the secondary transfer roller. The secondary transfer roller 201 is rotatably supported by a bearing 203, which can be slidingly moved toward, or away from, the intermediary transfer belt. Further, the bearing 203 is under the pressure generated by a compression spring 204 in the direction indicated by an arrow mark Fs, that is, the direction to move the bearing 203 toward the intermediary transfer belt. One of the lengthwise end portions of the axle of the secondary transfer roller 201 is fitted with a driving gear 202, to which driving force is transmitted from a driving force input gear 205. Thus, as rotational force is inputted into the driving gear 202 from the driving force input gear 205, the driving gear 202 is subjected to the force indicated by an arrow mark F in the drawing. That is, the driving gear 202 is subjected to a force, the direction of which is angled relative to the direction (indicated by arrow mark Fs in drawing) in which the secondary transfer roller 201 is pressed by the compression spring 204. Since the driving gear 202 is coaxial with the secondary transfer roller 201, which can be moved in the direction in which it is pressed by the compression spring 204, the secondary transfer roller 201 also is subjected to the force indicated by the arrow mark F. Therefore, the balance between the driver gear's side of the secondary transfer roller 201, from which the secondary transfer roller 201 is driven, and the opposite side of the secondary transfer roller 201, in terms of the direction parallel to the rotational axis of the secondary transfer roller 201, is disturbed by an amount equal to a component Ft (indicated by arrow mark F2 in drawing) of the force indicated by the arrow mark F in the drawing, in terms of the pressure to which the secondary transferring portion is subjected.

In the foregoing, a secondary transferring portion was described as the second transferring portion of an image forming apparatus of the intermediary transfer type. However, the same can be said about a transferring portion which directly transfers a toner image from a photosensitive member onto a sheet of recording medium, for example.

SUMMARY OF THE INVENTION

Thus, the primary object of the present invention is to provide an image forming apparatus which is structured so that its transferring member is pressured to be placed in contact with its image bearing member by a preset amount of pressure, and yet, the transferring portion is prevented from being changed in pressure by the driving force inputted into the transferring member.

The object described above can be achieved by an image forming apparatus which is in accordance with the present invention. In essence, According to an aspect of the present invention, there is provided an image forming apparatus comprising a rotatable image bearing member configured to carry a toner image; a rotatable transfer member contactable to an outer peripheral surface of said image bearing member to transfer a toner image from said image bearing member onto a recording material; an urging member configured to urge said transfer member toward said image bearing member; a supporting member supporting said transfer member so as to be movable toward and away from said image bearing member; a driving source configured to produce a rotational force for rotating said transfer member; and a coupling member provided opposed to said transfer member in an axial direction of said transfer member and configured to engage with said transfer member to transfer a driving force transmitted from said driving source, to said transfer member.

Further features of the present invention will become apparent from the following description of exemplary embodiments with reference to the attached drawings.

DESCRIPTION OF THE EMBODIMENTS

Hereinafter, the present invention is described in detail with reference to an image forming apparatus which is in accordance with the present invention.

Embodiment 1

1. Overall Structure and Operation of Image Forming Apparatus

Figure 1:
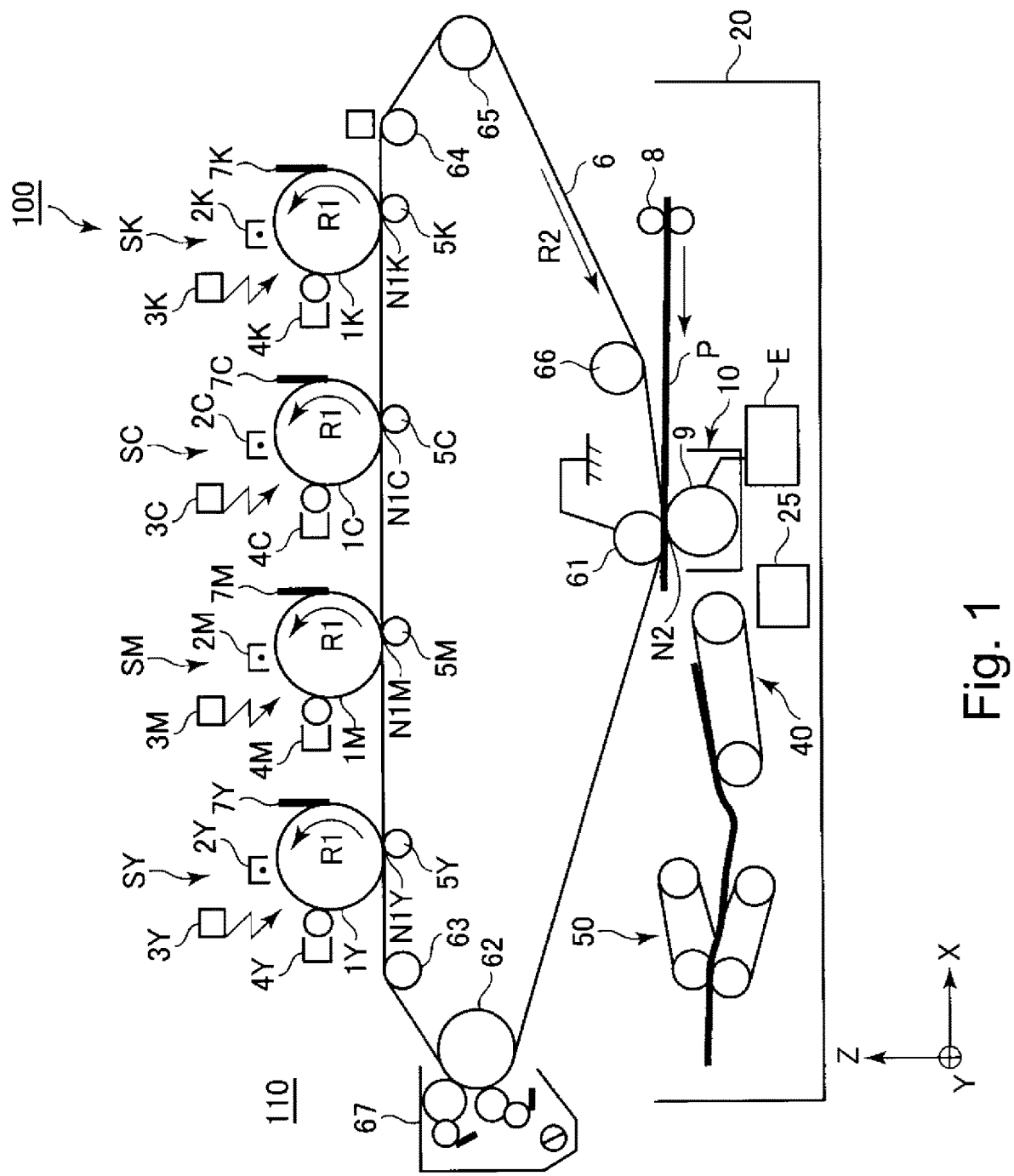
FIG. 1 is a schematic sectional view of a typical image forming apparatus to which the present invention is applicable.

FIG. 1 is a schematic sectional view of the image forming apparatus 100 in this embodiment. By the way, a direction indicated by an arrow mark Y in FIG. 1 is roughly parallel to the rotational axis of the photosensitive drum 1 and that of the secondary transfer roller 9. The photosensitive drum 1 and secondary transfer roller 9 will be described later. A direction indicated by an arrow mark X in the drawing is such a direction that is perpendicular to the direction indicated by the arrow mark Y. Here, it is assumed to be roughly parallel to the horizontal direction. Further, a direction indicated by an arrow mark Z in the drawing is such a direction that is perpendicular to the direction indicated by the arrow mark X, and the direction indicated by the arrow mark Y, in the drawing. Here, it is assumed to be roughly parallel to the gravity direction (vertical direction). Further, the front side in terms of the direction indicated by the arrow mark Y (front side of sheet of paper on which FIG. 1 is) is referred to as the front side of the image forming apparatus 100, and the rear side in terms of the direction indicated by the arrow mark Y (rear side of sheet of paper on which FIG. 1 is) is referred to as the rear side of the image forming apparatus 100. Further, here, "top side" and "bottom side"

means the top and bottom sides in terms of the gravity direction (vertical direction). However, they do not mean only the top and bottom directions. They include the upward and downward directions, with reference to the horizontal plane which is coincidental with a specific element or position.

The image forming apparatus 100 in this embodiment is a multifunction image forming apparatus (which is capable of functioning as copying machine, printer, and facsimileing machine). It is capable of forming a full-color image with the use of an electrophotographic method. Further, it is of the so-called intermediary transfer type, and also, of the so-called tandem type. It has multiple (four) image forming portions (stations), more specifically, image forming portions SY, SM, SC and SK, which form yellow (Y), magenta (M), cyan (C) and black (K) images, respectively. The elements of the image forming portions SY, SM, SC and SK, which are the same in function or structure, or correspondent in function or structure, may be sometimes described together without their suffixes Y, M, C and K which indicate the colors of the images they form. In this embodiment, each image forming portion S has a photosensitive drum 1, a charging apparatus 2, an exposing apparatus 3, a developing apparatus 4, a primary transfer roller 5, and a drum cleaning apparatus 7.

The photosensitive drum 1 is the first image bearing member. It is a rotatable photosensitive member (electrophotographic member). It is in the form of a drum. It is rotationally driven by the driving force transmitted thereto from a drum driving motor (unshown) as a driving force source, in the direction (counterclockwise direction) indicated by an arrow mark R1 in the drawing. As the photosensitive drum 1 rotates, its peripheral surface is uniformly charged by the charging apparatus 2 to preset polarity (negative) and potential level. The charged peripheral surface of the photosensitive drum 1 is scanned (exposed) by the exposing apparatus 3 (laser scanner) as an exposing means, based on the information of the image to be formed. As a result, an electrostatic image (electrostatic latent image) is formed on the peripheral surface of the photosensitive drum 1. This electrostatic image is supplied with toner (as developer), by the developing apparatus 4 as a developing means. Consequently, it is developed into a visible image. That is, a toner image (image formed of developer) is formed on the photosensitive drum 1. In this embodiment, charged toner, which is the same in polarity as the charged peripheral surface of the photosensitive drum 1, is adhered to the exposed points (image portions) of the peripheral surface of the photosensitive drum 1 (reversal development). In this embodiment, the normal polarity of charged toner (polarity during development) is negative.

The intermediary transfer belt 6 is the second image bearing member of the image forming apparatus 100. It is an intermediary transferring member, and is in the form of an endless belt formed of film. It is positioned so that it can be placed in contact with the peripheral surface of each of the four photosensitive drum 1Y, photosensitive drum 1M, photosensitive drum 1C, photosensitive drum 1K. The intermediary transfer belt 6 is suspended and tensioned by multiple suspending and tensioning rollers (supporting rollers), more specifically, a belt backing roller 61, a driving roller 62, auxiliary rollers 63 and 64, a tension roller 65, and a pressing roller 66. As the driving roller 62 is rotationally driven by the driving force transmitted thereto from a belt driving motor (unshown) as a driving force source, the intermediary transfer belt 6 circularly moves in the direction (clockwise direction) indicated by an arrow mark R2, at a peripheral velocity which is in a range of 150-1470 mm/sec. The belt backing roller 61 functions as a member (electrode) which opposes the secondary transfer roller 9, which will be described later. The driving roller 62 transmits driving force to the intermediary transfer belt 6. The auxiliary rollers 63 and 64 support the intermediary transfer belt 6 in such a manner that the intermediary transfer belt 6 can be placed in contact with the four photosensitive drum 1Y, 1M, 1C and 1K. The tension roller 65 keeps the intermediary transfer belt 6 stable in tension. The pressing roller 66 keeps the intermediary transfer belt 6 stable in the angle relative to the recording medium passage, at a preset value, in the area between itself and belt backing roller 61. On the inward side of the loop which the intermediary transfer belt 6 forms, the primary transfer roller 5, which is the primary transferring means and is in the form of a roller, is disposed. Each primary transfer roller 5 is kept pressed toward the corresponding photosensitive drum 1, with the presence of the intermediary transfer belt 6 between itself and photosensitive drum 1, forming thereby a primary transferring portion N1 (primary transfer nip), or the area of contact between the photosensitive drum 1 and intermediary transfer belt 6. The toner image formed on the photosensitive drum 1 as described above is transferred (primary transfer) onto the circularly moving intermediary transfer belt 6, by the function of the primary transfer roller 5 in the primary transferring portion N1. During an image forming operation, in synchronism with the conveyance of four toner images, which are different in color, to the corresponding primary transferring portions, primary transfer voltage (primary transfer bias) which is opposite in polarity from the normal toner charge, and is being controlled in voltage at a preset level, is applied to each primary transfer roller 5. For example, in an operation for forming a full-color image, four toner images are formed on the four photosensitive drums 1, one for one, and are sequentially transferred (primary transfer) in layers, onto the intermediary transfer belt 6.

On the outward side of the loop which the intermediary transfer belt 6 forms, a secondary transfer roller 9, as the secondary transferring member, is disposed in a position in which it opposes the belt backing roller 61. It is the secondary transferring means and is in the form of a roller. The secondary transfer roller 9 is kept pressed toward the belt backing roller 61, with the presence of the intermediary transfer belt 6 between the two rollers 9 and 61, forming thereby the secondary transferring portion N2 (secondary transfer nip), which is the area of contact between the intermediary transfer belt 6 and secondary transfer roller 9. The secondary transfer roller 9 is rotationally driven by the driving force transmitted thereto from a roller driving motor 25 (which may be referred to simply as "driving motor") as a driving force source. The toner image formed on the intermediary transfer belt 6 as described above is conveyed through the secondary transferring portion N2, while remaining sandwiched between the intermediary transfer belt 6 and a sheet P of recording medium such as paper. As it is conveyed through the secondary transferring portion N2 as described above, the toner image on the intermediary transfer belt 6 is transferred (secondary transfer) onto the sheet P. Also, during an image forming operation, the secondary transfer voltage (secondary transfer bias), which is the opposite in polarity from the normal toner charge, and is being controlled in voltage at a preset level, is applied to the secondary transfer roller 9 from the secondary transfer power source E, in synchronism with the conveyance of the toner image into the secondary transferring portion N2. For example, as the secondary transfer voltage, which is in a range of +1-+7 KV, is applied to the secondary transfer roller 9, +40-120 µA of electric current flows. Consequently, the toner image on the intermediary transfer belt 6 is transferred onto the sheet P. The sheet P is conveyed from a recording medium storage (unshown) to a pair of registration rollers 8 by a feed roller (unshown) and the like. Then, it is delivered to the secondary transferring portion N2 in synchronism with the conveyance of the toner image on the intermediary transfer belt 6, into the secondary transferring portion N2.

After the transfer of a toner image onto a sheet P of recording medium, the sheet P is conveyed by a pre-fixation sheet conveying apparatus 40 to a fixing apparatus 50 as a fixing means. The pre-fixation sheet conveying apparatus 40 has a rotatable belt, which is disposed in the center portion of the apparatus 40 in terms of the direction which is roughly perpendicular to the recording medium conveyance direction. The belt is 100-110 mm in width, and 1-3 mm in thickness. It is formed of rubbery material such as EPDM. The sheet P is conveyed further by being borne by this belt. This belt is provided with holes, which are 3-7 mm in diameter, making it possible for air to be suctioned through the belt from the inward side of the loop which the belt forms, in order to make the pre-fixation sheet conveying apparatus 40 stable in recording medium conveyance, by assuring that the sheet P is held to the belt. The fixing apparatus 50 fixes (welds) the toner image on the sheet P, to the sheet P by heating and pressing the sheet P, on which the toner image is present. After the fixation of the toner image to the sheet P, the sheet P is discharged from the main assembly 110 of the image forming apparatus 100, by a pair of discharge rollers (unshown) or the like.

The toner which is remaining on the photosensitive drum 1 after the primary transfer, that is, the toner which failed to be transferred onto the intermediary transfer belt 6 during the primary transfer of the toner image from the photosensitive drum 1, is removed from the photosensitive drum 1 by a drum cleaning apparatus 7 as a means for cleaning the photosensitive drum 1, and is recovered by the apparatus 7. Further, the image forming apparatus 100 is provided with a belt cleaning apparatus 67 as a means for cleaning the intermediary transfer belt 6. The belt cleaning apparatus 67 is disposed on the outward side of the loop which the intermediary transfer belt 6 forms, being position so that it opposes the driving roller 62. The toner which is remaining on the intermediary transfer belt 6 after the secondary transfer, that is, the toner which failed to be transferred onto the sheet P during the secondary transfer, is electrostatically removed by the belt cleaning apparatus 67, and then, is recovered by the apparatus 67.

In this embodiment, the image forming apparatus 100 is provided with a conveyance frame 20, which holds the secondary transfer roller 9, etc. The image forming apparatus 100 is structured so that the conveyance frame 20 can be pulled out of the main assembly 110 to allow a user or an operator to access the recording medium passage to deal with paper jam, and/or the like, to maintain the apparatus 100. In the case of this embodiment, the main assembly 110 (which hereafter may be referred to simply as main assembly) of the image forming apparatus 100 means the portion of the image forming apparatus 100, which will remain after the conveyance frame 20 is pulled out of the image forming apparatus 100. In this embodiment, the conveyance frame 20 holds the registration rollers 8, pre-fixation sheet conveying apparatus 40, fixing apparatus 50, etc., in addition to a transfer unit 10, a driving motor 25, etc., which will be described later. That is, the image forming apparatus 100 is structured so that these components can be pulled out of the main assembly 110. In this embodiment, the conveyance frame 20 is slidingly movable in the direction indicated by the arrow mark Y in FIG. 1. Not only can the frame 20 be pulled out of the main assembly 110 in the frontward direction, in terms of the direction indicated by the arrow mark Y (toward front side of sheet of paper on which FIG. 1 is), but also, can be inserted into the main assembly 110 in the rearward direction, in terms of the direction indicated by the arrow mark Y.

By the way, in this embodiment, the primary transfer roller 5 has a metallic core, and an elastic layer which wraps around the metallic core. The elastic layer is formed of an ion-conductive foamed rubber. Also in this embodiment, the primary transfer roller 5 is 15-20 mm in external diameter, and is $1\times10^5$-$1\times10^8\Omega$ in electrical resistance (23° C., 50% RH, 2 KV). Also, in this embodiment, the secondary transfer roller 9 has a metallic core, and an elastic layer formed of ion-conductive foamed rubber, on the metallic core in a manner to wrap around the core. The secondary transfer roller 9 is 20-25 mm in external diameter, and is $1\times10^5$-$1\times10^8\Omega$ in electrical resistance (23° C., 50% RH, 2 KV). Further, the belt backing roller 61 in this embodiment has a metallic core, and an elastic layer which wraps around the metallic core. The elastic layer is formed of an ion-conductive foamed rubber. Also, in this embodiment, the belt backing roller 61 is 20-22 mm in external diameter, and is $1\times10^5$-$1\times10^8\Omega$ in electrical resistance (23° C., 50% RH, 50 V).

2. Transfer Unit

<Overall Structure of Transfer Unit>

Figure 2:
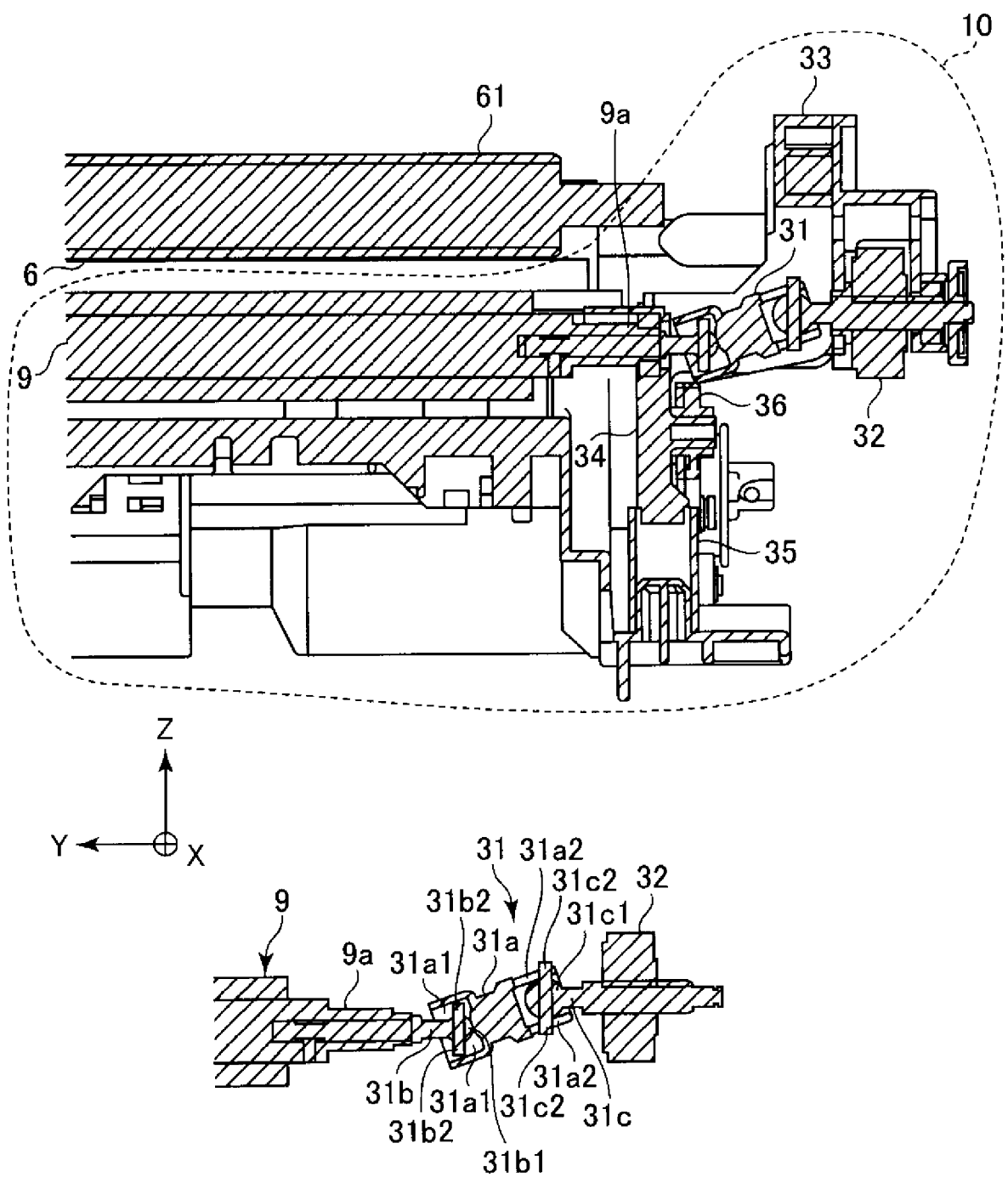
FIG. 2 is a sectional view of one of the lengthwise end portions of the secondary transfer roller and its adjacencies, at a plane Y-Z, when the secondary transfer roller is in its separation position.
Figure 3:
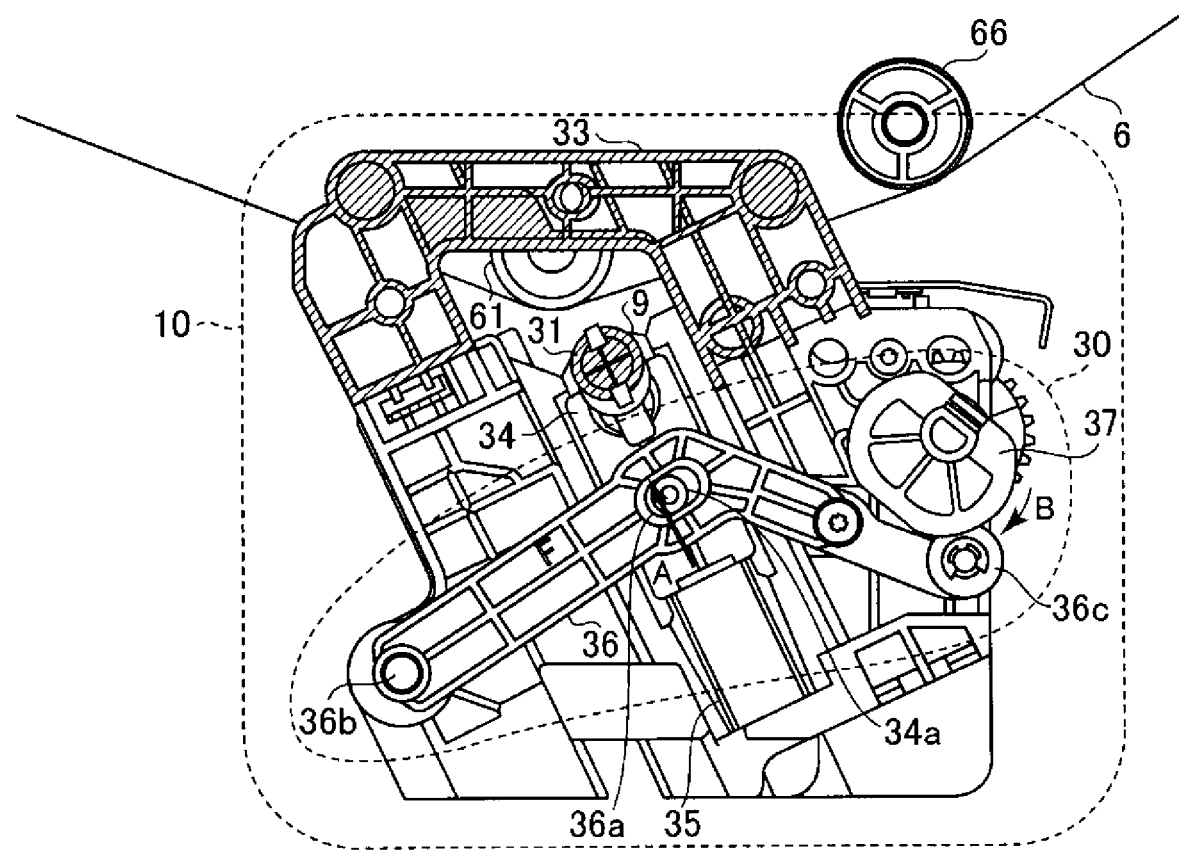
FIG. 3 is a sectional view of one of the lengthwise end portions of the secondary transfer roller and its adjacencies, at a plane X-Z, when the secondary transfer roller is in its contact position.
Figure 4:
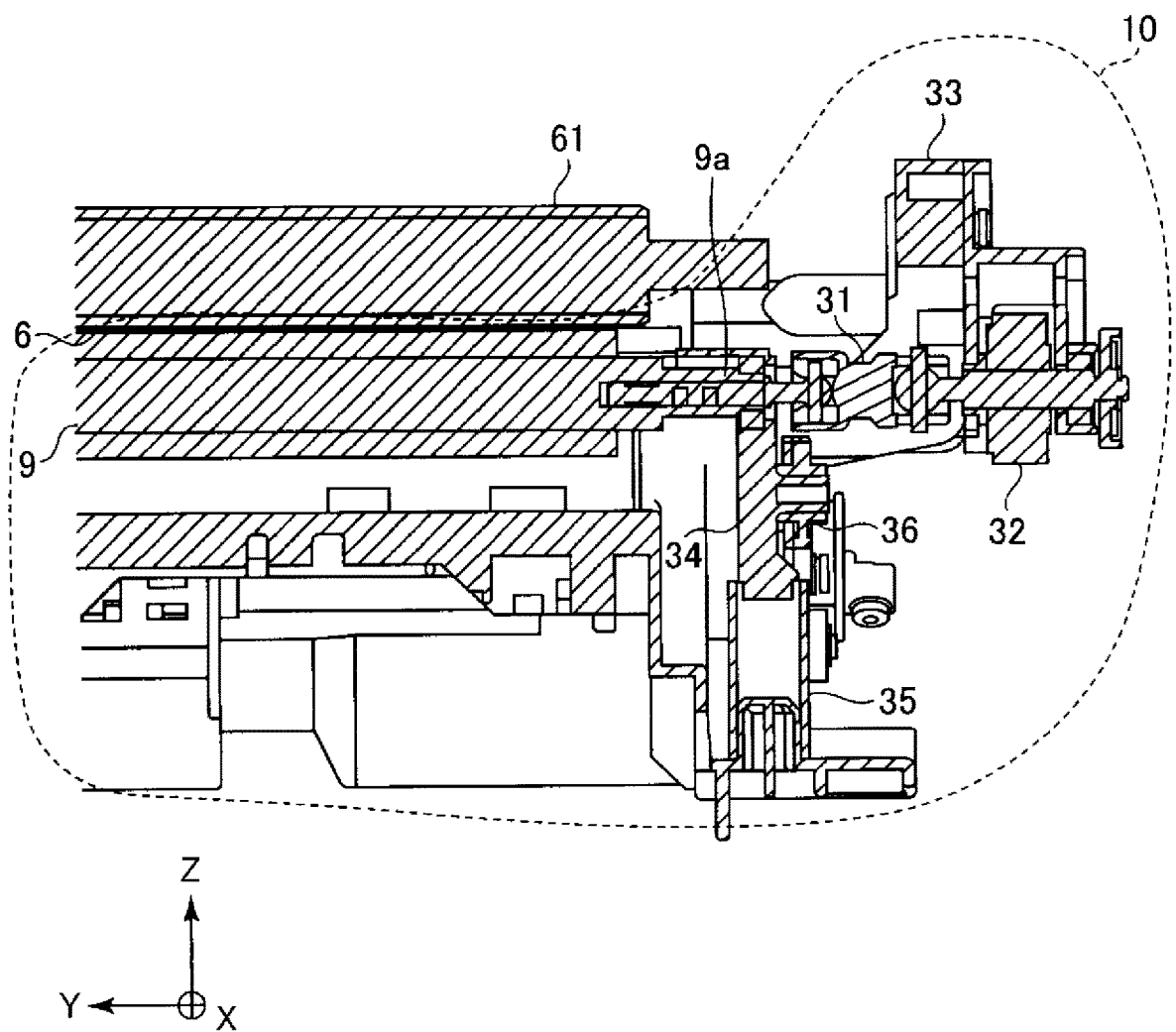
FIG. 4 is a sectional view of one of the lengthwise end portions of the secondary transfer roller and its adjacencies, at a plane Y-Z, when the secondary transfer roller is in its contact position.
Figure 5:
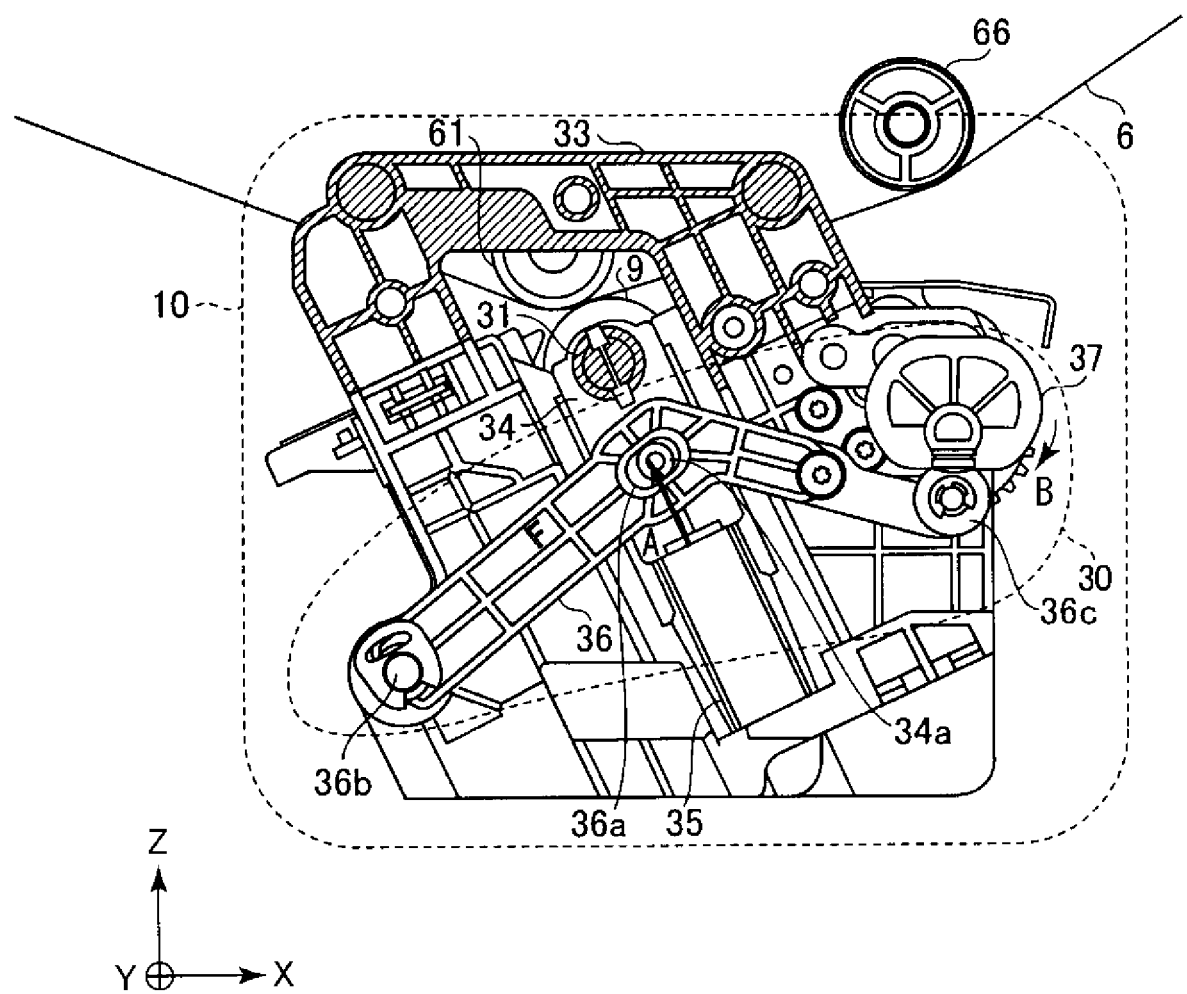
FIG. 5 is a sectional view of one of the lengthwise end portions of the secondary transfer roller and its adjacencies, at a plane X-Z, when the secondary transfer roller is in its contact position.

Next, the transfer unit 10 is described. FIG. 2 is a schematic sectional view (at Y-Z plane) of one of the lengthwise end portions (front end portion) of the secondary transfer roller 9, and its adjacencies, in terms of the direction parallel to the rotational axis of the secondary transfer roller 9, as seen from the downstream side of the transfer unit 10 in terms of the recording medium conveyance direction. FIG. 3 is a schematic sectional view (at plane X-Z) of one of the lengthwise end portions (front end portion) in terms of the direction parallel to the secondary transfer roller 9, as seen from the front side. FIGS. 2 and 3 show the state of a combination of one of the lengthwise end portions of the secondary transfer roller 9, and its adjacencies, in which the secondary transfer roller 9 is in a position in which the secondary transfer roller 9 is kept separated from intermediary transfer belt 6 by a contact/separation mechanism 30 (this position may be referred to simply as "separation position", hereafter). On the other hand, FIGS. 4 and 5 are similar to FIGS. 2 and 3. They show the state of the combination of one of the lengthwise end portions of the secondary transfer roller 9, in terms of the direction parallel to the rotational axis of the secondary transfer roller 9, and its adjacencies, when the secondary transfer roller 9 is in a position (which hereafter will be referred simply as "contact position") into which the secondary transfer roller 9 was moved by the contact/separation mechanism 30.

Generally speaking, the transfer unit 10 has the secondary transfer roller 9, contact/separation mechanism 30 as a means for placing the secondary transfer roller 9 in contact with the intermediary transfer belt 6, or separating the secondary transfer roller 9 from the intermediary transfer belt 6, and a transfer frame 33 as a supporting member to which these components are attached. Next, the transfer unit 10 is described in greater detail.

<Support Structure and Contact/Separation Structure>

To begin with, the portion of the transfer unit 10, which supports the secondary transfer roller 9, and the portion of the transfer unit 10, which places the secondary transfer roller 9 in contact the intermediary transfer belt 6, or separates the secondary transfer roller 9 from the intermediary transfer belt 6 is described about their structure. The secondary transfer roller 9 is rotatably supported by a bearing 34, by the end portion of its metallic core, which is protrusive from the lengthwise end of the elastic layer in the direction parallel to the rotational axis of the secondary transfer roller 9. The bearing 34 is attached to the transfer frame 33 in such a manner that it is allowed to slide toward or away from the intermediary transfer belt 6. Further, the bearing 34 is kept pressed toward (upward in drawing) the intermediary transfer belt 6 (and belt backing roller 61) by the compression spring 35 (pressing member) as a pressing means, as indicated by an arrow mark A in FIGS. 3 and 5.

The contact/separation means 30 has a linkage 36 which is in connection to the bearing 34, and a cam 37. More specifically, the linkage 36 is provided with a hole 36a, which is roughly in the center of the linkage 36 in terms of the left-right direction in FIGS. 3 and 5. The bearing 34 is provided with a protrusion 34a, which fits into the hole 36a of the linkage 36. Further, the linkage 36 is attached to the transfer frame 33 in such a manner that it is allowed to pivotally move about the shaft 36b (pivot, with which one of the lengthwise ends of the transfer frame 33, in terms of the left-right direction in FIGS. 3 and 5, is provided, and also, that the other lengthwise end, as a cam follower portion 36c, remains in contact with the cam 37. The cam 37 moves the bearing 34 by way of the linkage 36, by rotating in the direction indicated by an arrow mark B in FIGS. 3 and 5, causing thereby the secondary transfer roller 9 to be placed in contact with, or moved away from, the intermediary transfer belt 6 (and belt backing roller 61). That is, the contact/separation mechanism 30 can move the secondary transfer roller 9 between the contact position and separation position. The cam 37 is rotated by the driving force transmitted thereto from a cam driving motor (unshown) as a driving force source. In this embodiment, this cam driving motor is attached to the conveyance frame 20, like the driving motor 25, which will be described later. The image forming apparatus 100 is structured to allow the secondary transfer roller 9 to move toward the intermediary transfer belt 6 or opposite direction in terms of the direction in which the secondary transfer roller 9 is pressed by the compression spring 35, so that the pressure which is generated in the secondary transferring portion N2 when the secondary transfer roller 9 is in the contact position is affected by the thickness of a sheet P of recording medium, amount of frictional wear of the secondary transfer roller 9, etc. That is, in order to prevent the pressure generated in the secondary transferring portion N2 by the secondary transfer roller 9, from being affected by the thickness of the sheet P of recording medium, the image forming apparatus 100 is structured so that the secondary transfer roller 9 is automatically changed in position as the sheet P moves through the secondary transferring portion N2.

By the way, FIGS. 2-5 show only the supporting structure and contact/separation mechanism which are in the front side of the main assembly 110 in terms of the direction parallel to the rotational axis of the secondary transfer roller 9. However, the support structure and contact/separation mechanism on the other side are the same as those on the front side (they are roughly symmetrical to those in front, with reference to center of secondary transfer roller 9 in terms of direction parallel to rotational axis of secondary transfer roller 9). That is, the rear end portion of the main assembly 110 also is provided with a bearing (34), a compression spring (35), and a contact/separation mechanism (30), which are similar to those on the front side, and are also attached to the transfer frame 33.

<Structure of Driving Force Transmission Mechanism>

Next, the mechanism for transmitting driving force to the secondary transfer roller 9 is described about its structure. The transfer unit 10 is attached to the conveyance frame 20 which can be pulled out of the main assembly 110 of the image forming apparatus 100. If a paper jam, for example, occurs, the conveyance frame 20 can be pulled out of the main assembly 110 to deal with the jam. As the conveyance frame 20 is inserted into the main assembly 110, the transfer unit 10 is placed in a preset position relative to the intermediary transfer frame (unshown) which is holding the intermediary transfer belt 6. In this embodiment, the transfer unit 10 is provided with a pin, whereas the intermediary transfer frame is provided with a hole into which this pin of the transfer unit 10 fits. Thus, as the conveyance frame 20 is inserted into the main assembly 110, the pin fits into the hole to keep the conveyance frame 20 properly position. In this embodiment, the conveyance frame 20 is provided with a space into which the transfer unit 10 is allowed to downwardly retract by moving relative to the conveyance frame 20. As the conveyance frame 20 is pulled out of the main assembly 110, the conveyance frame 20 is released from the intermediary transfer frame, being allowed to move away from the intermediary transfer belt 6, with the use this space. Therefore, even if the image forming apparatus 100 stops while the secondary transfer roller 9 is in the contact position, in which the secondary transfer roller 9 is placed by the contact/separation mechanism 30, as the conveyance frame 20 is pulled out of the main assembly 110, the secondary transfer roller 9 separates from the intermediary transfer belt 6. Therefore, the conveyance frame 20 can be pulled out from the main assembly 110 without damaging the secondary transfer roller 9 and intermediary transfer belt 6. Because the image forming apparatus 100 is structured as described above, as the conveyance frame 20 is inserted into the main assembly 110, and the transfer unit 10 is positioned in the preset position relative to the intermediary transfer frame, the transfer unit 10 hangs from the intermediary transfer frame. Therefore, from the standpoint of reducing the amount of load to which the intermediary transfer frame is subjected, the transfer unit 10 is desired to be as light as possible. In this embodiment, therefore, the driving motor 25 as the power source for driving the secondary transfer roller 9 is attached to the conveyance frame 20.

Hereinafter, a position into which the transfer unit 10 is placed to be properly positioned relative to the intermediary transfer frame may be referred to simply as "positioning position". Even when the transfer unit 10 is in the positioning position, the secondary transfer roller 9 can be placed in contact with the intermediary transfer belt 6, or can be separated from the intermediary transfer belt 6, by the contact/separation mechanism 30. Further, a position into which the transfer unit 10 retracts after it is released from the intermediary transfer frame and retracts away from the intermediary transfer belt 6 may be referred to simply as "retraction position", as long as the transfer unit 10 is in the retraction position, the secondary transfer roller 9 is allowed to separate from the intermediary transfer belt 6, regardless of whether the secondary transfer roller 9 is in the contact position or separation position, into which it is moved by the contact/separation mechanism 30. By the way, all of FIGS. 2-5 show one of the lengthwise end portions of the transfer unit 10, when the transfer unit 10 is in the positioning position.

Figure 6:
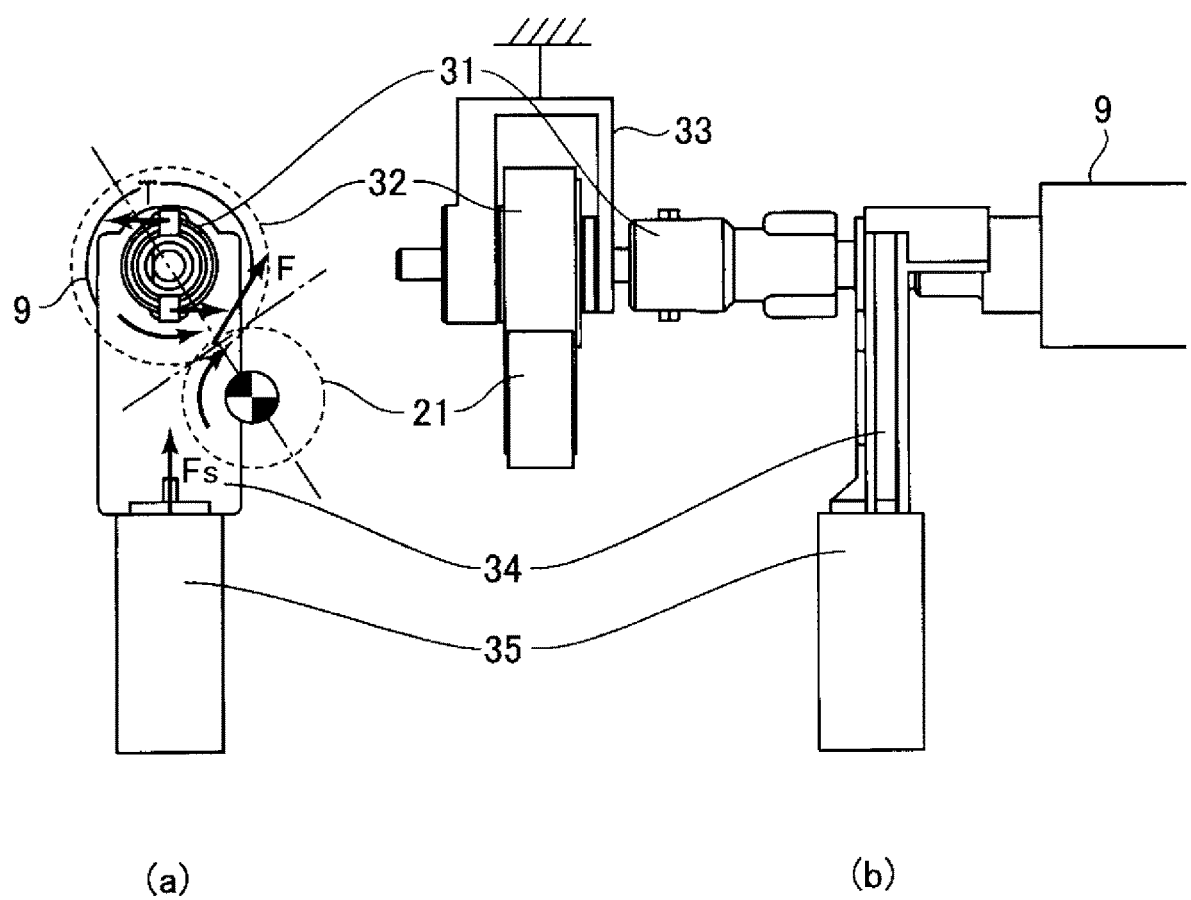
FIG. 6 is a schematic drawing of a mechanism for driving the secondary transfer roller.

FIG. 6 is a schematic drawing of the mechanism for driving the secondary transfer roller 9 in this embodiment. It shows the structure of the driving mechanism. Part (a) of FIG. 6 is a schematic drawing of the driving mechanism as seen from the front side, in terms of the direction (indicated by arrow mark Y), which is parallel to the rotational axis of the secondary transfer roller 9. Part (b) of FIG. 6 is a schematic drawing of the mechanism as seen from the upstream side in terms of the recording medium conveyance direction, that is, the horizontal direction (indicated by arrow mark X). Referring to FIGS. 2, 4 and 6, the secondary transfer roller 9 is in connection to the driving gear 32 as a driving member which is a driving force transmitting member, by way of a joint 31 which is a connective member. The driving gear 32 is supported by transfer frame 33 in such a manner that only movement allowed to the driving gear 32 is rotational movement (however, it is afforded a preset amount of play in the direction parallel to the rotational axis of the secondary transfer roller 9. That is, the secondary transfer roller 9, which is allowed to move in the direction in which it is pressed by the compression spring 35 is allowed to move relative to the transfer frame 33, independently from the driving gear 32. To the driving gear 32, driving force is transmitted from the driving force input gear 21, which will be described later.

Referring to FIGS. 2 and 4, in this embodiment, the joint 31 is a universal joint which has a pair of movable joints at its lengthwise ends, one for one. That is, the joint 31 has a main portion 31*a*, a roller's side connective portion 31*b*, and a gear's side connective portion 31*c*. One end (rear end) of the roller's side connective portion 31*b* is coaxially fixed to the front end of the metallic core 9*a* (shaft), in terms of the direction parallel to the rotational axis of the secondary transfer roller 9, whereas the other end (front end) is provided with a ball joint 31*b*1. Further, one end (front end) of the gear's side connective portion 31*c* is coaxially fixed to the driving gear 32, whereas the other end (rear end) is provided with a ball joint 31*c*1. The ball joint 31*b*1 of the roller's side connective portion 31*b*, and the ball joint ball joint 31*c*1 of the gear's side connective portion 31*c*, are in connection to the rear and front ends, respectively, of the main portion 31*a*, in such a manner that they are allowed to change in their angle relative to the main portion 31*a*, within a preset range. The ball joint 31*b*1 of the roller's side connective portion 31*b* is provided with a pair of protrusions 31*b*2, which are roughly 180° apart from each other in terms of the rotational direction of the secondary transfer roller 9 and are protrusive in the same direction as the radius direction of the secondary transfer roller 9. As the pair of protrusions 31*b*2 engages with the corresponding catching portion 31*a*1 of the rear end of the main portion 31*a*, the rotational force is transmitted. Referring to FIG. 4, in this embodiment, the image forming apparatus 100 is structured so that as the secondary transfer roller 9 is moved into the contact position by the contact/separation mechanism 30, the rotational axis of the secondary transfer roller 9 roughly align with the rotational axis of the driving gear 32. As the two rotational axes become roughly aligned with each other, the rotational axis of the secondary transfer roller 9, rotational axis of the main portion 31*a*, and rotational axis of the driving gear 32 become roughly aligned with each other. Further, referring to FIG. 2, in this embodiment, as the secondary transfer roller 9 is moved into the separation position by the contact/separation mechanism 30, the rotational axis of the secondary transfer roller 9 becomes unaligned from the rotational axis of the driving gear 32. That is, the rotational axis of the secondary transfer roller 9 becomes intersectional to the rotational axis of the main portion 31*a* at a certain angle, and the rotational axis of the main portion 31*a* becomes intersectional to that of the driving gear 32 at a certain angle. In this embodiment, the image forming apparatus 100 is structured so that, regardless of whether the secondary transfer roller 9 is moved into the contact position, separation position, or a position between the contact position and separation position, by the contact/separation mechanism 30, the driving force can be transmitted from the driving gear 32 to the secondary transfer roller 9.

By the way, this embodiment is not intended to limit the present invention in scope in terms of the structure of the joint 31. That is, the present invention is compatible with any joint usable with the image forming apparatus 100. The joint 31 needs to be enabled to keep the secondary transfer roller 9 and driving gear 32 connected in such a manner that when the secondary transfer roller 9 is in the contact position, it is allowed to move toward, or away from, the intermediary transfer belt 6 in the direction parallel to the direction in which it is pressed by the compression spring 35, while remaining in contact with the intermediary transfer belt 6. Further, the joint 31 needs to be enabled to transmit the driving force from the driving gear 32 to the secondary transfer roller 9, regardless of how and where the secondary transfer roller 9 is moved. As long as these conditions are met, it is possible to prevent the pressure of the secondary transferring portion N2 from being affected by the thickness of a sheet P of recording medium, amount of frictional wear of the secondary transfer roller 9, etc. In this embodiment, the joint 31 is what can connect the secondary transfer roller 9 and driving gear 32 to each other in such a manner that the secondary transfer roller 9 can be moved relative to the driving gear 32 supported in such a manner that it is allowed only rotational movement, between the contact position and separation position by the contact/separation mechanism 30. Further, in this embodiment, the joint 31 is what can transmit the driving force from the driving gear 32 to the secondary transfer roller 9, regardless of whether the secondary transfer roller 9 is positioned in the contact position, separation position, or any position between the contact position and separation position, by the contact/separation mechanism 30.

Figure 14:
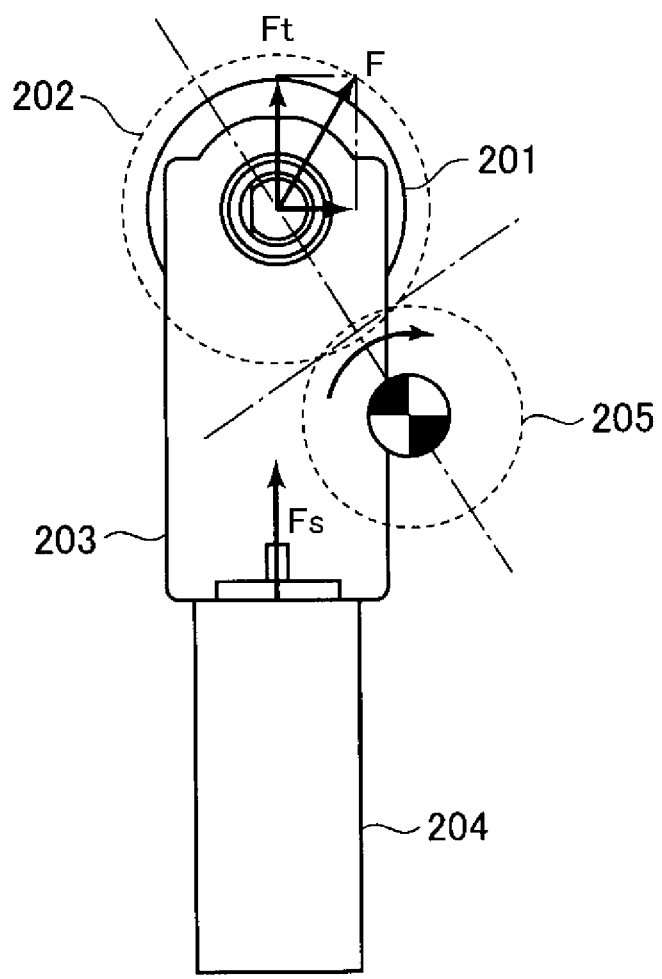
FIG. 14 is a schematic drawing of a conventional mechanism for driving the secondary transfer roller.

Referring to FIG. 6, as rotational force is inputted into the driving gear 32 from the driving force input gear 21 which will be described later, the driving gear 32 is subjected to such force that is directed as indicated by the arrow mark F. That is, the driving gear 32 is pressed toward the intermediary transfer belt 6 by such force that holds a certain angle relative to the direction (indicated by arrow mark Fs in drawing) in which force is generated by the compression spring 35 bears on the driving gear 32. In this embodiment, however, the driving gear 32 is supported by a shaft in such a manner that only movement it is allowed is rotation. Further, the secondary transfer roller 9 is in indirect connection to the driving gear 32 by way of the joint 31. Moreover, the image forming apparatus 100 is structured so that the secondary transfer roller 9, which is allowed to move in the direction parallel to the force generated by the compression spring 35, is allowed to move relative to the transfer frame 33 independently from the driving gear 32. Therefore, the secondary transfer roller 9 is subjected to two types of force, which are parallel to the direction indicated by a pair of arrow marks T in the drawing by way of the joint 31, are opposite in direction. More specifically, the top side of the secondary transfer roller 9, with reference to the rotational axis of the secondary transfer roller 9, is subjected to such force that is parallel to a line which is tangential to the peripheral surface of the secondary transfer roller 9 at a point on the peripheral surface of the secondary transfer roller 9, which corresponds in position to the point of connection between the main portion 31*a* of the joint 31 and the gear's side connective portion 31*c*, whereas the bottom side of the secondary transfer roller 9, or the opposite side of the secondary transfer roller 9, is subjected to such force that is parallel to a line which is tangential to the peripheral surface of the secondary transfer roller 9, at another point on the peripheral surface of the secondary transfer roller 9, which is roughly 180-apart from the given point, in terms of the rotational direction of the secondary transfer roller 9, which corresponds in position to the point of connection between the main portion 31*a* and the roller's side connective portion 31*b*. Therefore, the two forces indicated by the arrow marks T and are opposite in direction, and bear on the metallic core 9*a* (shaft) cancelled. Therefore, the secondary transfer roller 9 is subjected to only the rotational force. Therefore, unlike the structure described with reference to FIG. 14, it is possible to prevent the problem that the balance, in terms of pressure, between the driving gear's side of the secondary transferring portion N2, and the roller's side of the secondary transferring portion N2, is broken.

<Structure of Driving Force Input Mechanism>

Figure 7:
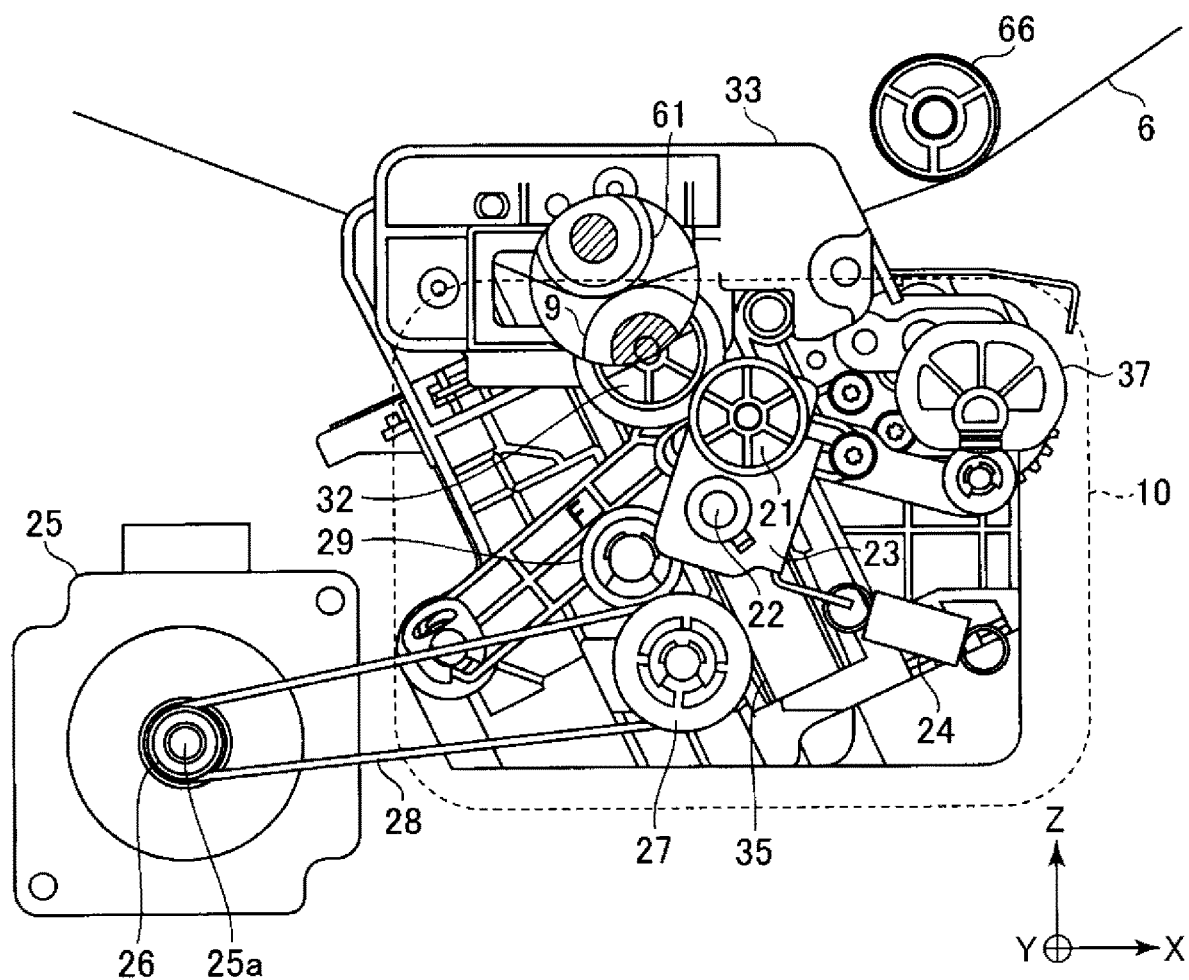
FIG. 7 is a sectional view of one of the lengthwise end portions of the secondary transfer roller and its adjacencies, at a plane Y-Z, when the secondary transfer roller is in its positioning position.

Next, the mechanism for inputting driving force into the secondary transfer roller 9 is described about its structure. FIG. 7 is a schematic sectional view (partially cut-out side view) of one (front) of the lengthwise end portions of the secondary transfer roller 9 in terms of the direction parallel to the rotational axis of the secondary transfer roller 9, and its adjacencies, at a plane (X-Z) perpendicular to the rotational axis, as seen from the front side of the image forming apparatus 100. It shows the state of the abovementioned portions of the image forming apparatus 100 when the transfer unit 10 is in the positioning position. As for FIG. 8, it is basically the same as FIG. 7, except that unlike FIG. 7, the abovementioned portions are in a state in which the transfer unit 10 is in the retraction position. In both FIGS. 7 and 8, the secondary transfer roller 9 is in the contact position, into which it was moved by the contact/separation mechanism 30.

Figure 8:
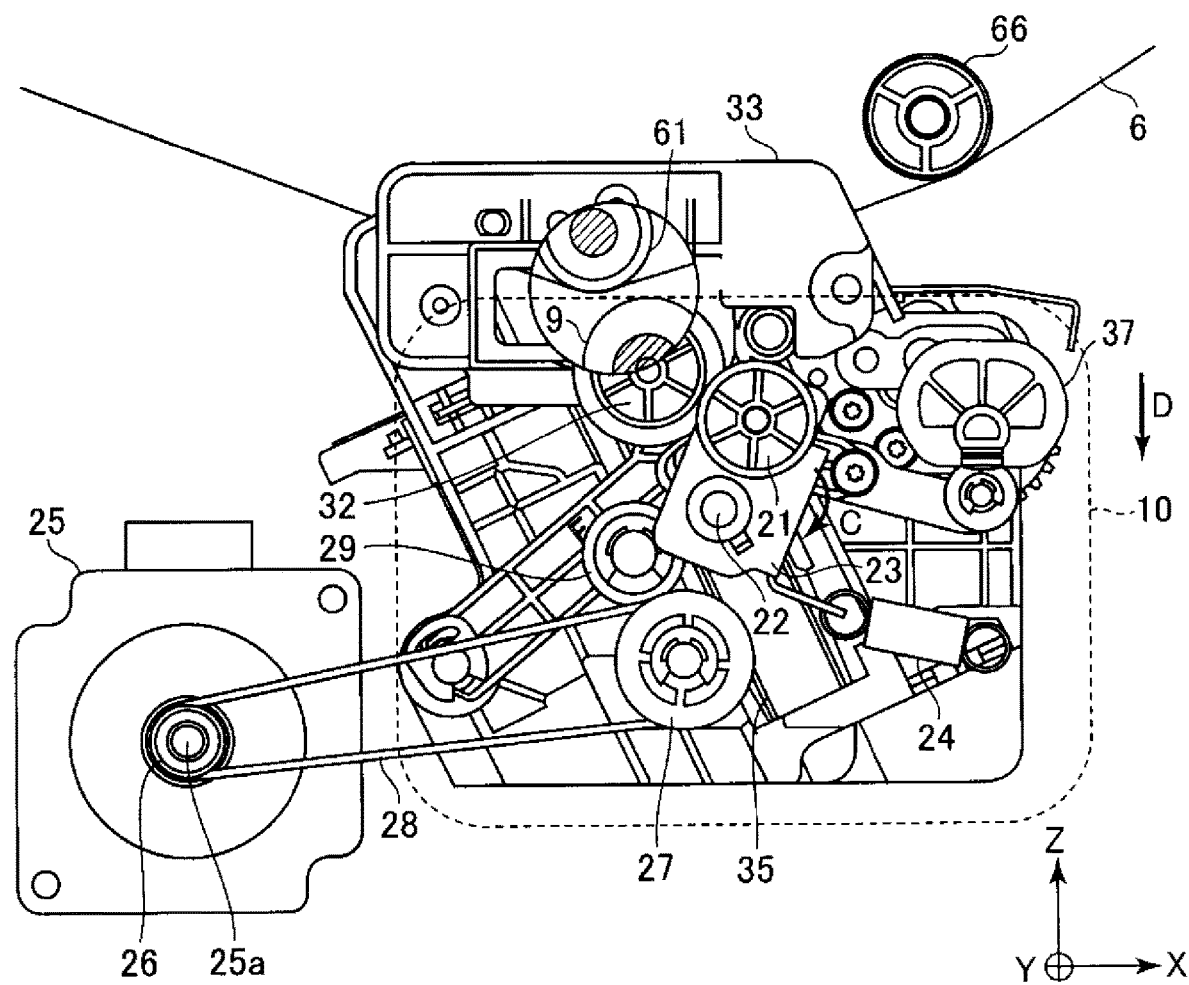
FIG. 8 is a sectional view of one of the lengthwise end portions of the secondary transfer roller and its adjacencies, at a plane X-Z, when the secondary transfer roller is in its retraction position.

Referring to FIGS. 6-8, driving force is inputted into the driving gear 32 with the use of the driving force input gear 21, as a driving force inputting member, which is a driving force transmitting member. The driving force input gear 21 is rotatably attached to the supporting portion 23, which is pivotally movable about a shaft 22. The supporting portion 23 is under the pressure generated by a tension spring 24 as a pulling member in a direction to cause the driving force input gear 21 to mesh with the driving gear 32. One end of the tension spring 24 is in connection to the supporting portion 23, and the other end is in connection to the conveyance frame 20.

To the driving force input gear 21, driving force is inputted from the driving motor 25, with which the conveyance frame 20 is provided. The driving force from the driving motor 25 is transmitted to the driving force input gear 21 by way of a first pulley 26 fixed to the output shaft 25*a* of the driving motor 25, a second pulley 27, a driving belt 28 suspended by the first and second pulleys 26 and 27, a group of idler gears 29 (only some of them are shown).

By the way, this embodiment is not intended to limit the present invention in scope in terms of the structure of each of the driving force transmitting members of the drive train between the driving motor 25 and the joint 31. That is, the present invention is compatible with any structure for any of the abovementioned driving force transmitting members, as long as it is usable by an image forming apparatus such as the one in this embodiment. For example, the present invention is also applicable to an image forming apparatus structured so that driving force is transmitted from a driving force source to a driving force inputting member by a gear train instead of a combination of pulleys and belt, or the driving force is transmitted from the driving force inputting member to the driving member with the use of a combination of pulleys and a belt. Further, in a case where a small driving motor 25 is usable, an image forming apparatus may be structured so that the driving motor 25 and driving force input gear 21 are directly supported by transfer frame 33 (supporting member) as parts of transfer unit 10.

<Contact/Separation Operation>

Next, referring to FIGS. 2-6, the operation to place the secondary transfer roller 9 in contact with intermediary transfer belt 6, and the operation to separating the secondary transfer roller 9 from the intermediary transfer belt 6, are described. As described above, all of FIGS. 2-5 show the state of a combination of one of the lengthwise end portions of the secondary transfer roller 9 and its adjacencies, in which the transfer unit 10 is in the positioning position.

Referring to FIGS. 2 and 3, prior to the starting of an image forming operation, the secondary transfer roller 9 is kept separated from the intermediary transfer belt 6. That is, the secondary transfer roller 9 is in the separation position, into which it was moved by the contact/separation mechanism 30. As an image forming operation is started, driving force is inputted into the driving roller 62 for the intermediary transfer belt 6. Thus, the intermediary transfer belt 6 begins to rotate. Next, driving force is inputted into the driving gear 32. This driving force is inputted into the secondary transfer roller 9 by way of the joint 31. As a result, the secondary transfer roller 9 rotates. Next, the cam 37 of the contact/separation mechanism 30 rotates, allowing the compression spring 35 to press the secondary transfer roller 9. Consequently, the secondary transfer roller 9 is moved toward the intermediary transfer belt 6 by the pressure from the compression spring 35, being thereby placed in contact with the intermediary transfer belt 6. That is, the secondary transfer roller 9 is moved into the contact position by the contact/separation mechanism 30.

As the image forming operation ends, the cam 37 of the contact/separation mechanism 30 rotates, preventing the compression spring 35 from pressing the secondary transfer roller 9. Consequently, the secondary transfer roller 9 is moved in the direction to separate from the intermediary transfer belt 6 against the pressure from the compression spring 35. As a result, the secondary transfer roller 9 separates from the intermediary transfer belt 6. That is, the secondary transfer roller 9 is returned to the separation position by the contact/separation mechanism 30. Thereafter, the driving of the intermediary transfer belt 6 and secondary transfer roller 9 is stopped, with the secondary transfer roller 9 being kept in the separation position.

As described above, according to this embodiment, rotational force is inputted into the movable secondary transfer roller 9 from the driving gear 32 which is supported by the transfer frame 33 in such a manner that only movement the driving gear 32 is allowed is to be rotated by way of joint 31. Therefore, it is possible to prevent the problem that the pressure of the secondary transferring portion N2 is affected by the inputting of driving force into the driving gear 32.

Further, according to this embodiment, rotational force can be inputted into the secondary transfer roller 9 regardless of whether the secondary transfer roller 9 is in the contact position or separation position, into which it is moved by the contact/separation mechanism 30. Therefore, it becomes possible to prevent the problem that placement of the secondary transfer roller 9 in contact with the intermediary transfer belt 6, or the separation of the secondary transfer roller 9 from the intermediary transfer belt 6, by the contact/separation mechanism 30, affect the amount of load to which the intermediary transfer belt 6 is subjected.

<Operation to Retract Transfer Unit>

Next, referring to FIGS. 7 and 8, the operation to retract the transfer unit 10 to deal with a paper jam or the like situation is described further.

Referring to FIG. 7, during an image forming operation, the secondary transfer roller 9 is kept in contact with the intermediary transfer belt 6. That is, the secondary transfer roller 9 is kept in the contact position by the contact/separation mechanism 30. If the image forming apparatus 100 stops while it is in the state shown in FIG. 7, the secondary transfer roller 9 remains in contact with the intermediary transfer belt 6. If the conveyance frame 20 is pulled out of the main assembly 110 while the secondary transfer roller 9 is in contact with the intermediary transfer belt 6, it is possible the secondary transfer roller 9 and/or intermediary transfer belt 6 will be damaged. By the way, in this embodiment, if the image forming apparatus 100 becomes abnormal in operation, for example, if its contact/separation mechanism 30 suffers from problems, it is possible that the image forming apparatus 100 stop operating while the secondary transfer roller 9 is kept in the contact position by the contact/separation means 30.

In this embodiment, if an attempt is made to pull the conveyance frame 20 output of main assembly 110, the transfer unit 10 is released from the intermediary transfer frame. Thus, the transfer unit 10 retracts in the direction (downward in drawing) to separate from the intermediary transfer belt 6 as indicated by an arrow mark D in FIG. 8. Therefore, even if the image forming apparatus 100 stops operating while the secondary transfer roller 9 is kept in the contact position by the contact/separation mechanism 30, as the conveyance frame 20 is pulled out of the main assembly 110, the secondary transfer roller 9 separates from the intermediary transfer belt 6.

In this embodiment, the driving force input gear 21 pivotally moves about the shaft 22. Therefore, as the transfer unit 10 retracts, the driving force input gear 21 also is allowed to retract, while remaining in mesh with the driving gear 32, in the direction indicated by an arrow mark C in FIG. 8. Therefore, in this embodiment, the drive train from the driving motor 25, and the driving train from the driving motor 25 to the driving gear 32 do not need to be attached to transfer frame 33 so that they move with the transfer frame 33. That is, in this embodiment, the driving motor 25, etc., may be attached to the conveyance frame 20. Thus, this embodiment makes it possible to reduce the transfer unit 10 in weight. Therefore, even if the image forming apparatus 100 is structured so that as the transfer unit 10 is positioned for transfer, it hangs from the intermediary transfer frame, the amount of load to which the intermediary transfer frame is subjected is significantly smaller than the one to which the intermediary transfer frame of any conventional image forming apparatus is subjected. Further, this embodiment can significantly reduce the requirements regarding the positioning of the driving force source 25, making it possible to more efficiently use the internal space of the main assembly 110.

In this embodiment, the operation to retract the transfer unit 10 while the secondary transfer roller 9 is kept in the separation position by the contact/separation mechanism 30 is the same as the one described above. That is, in this embodiment, the driving gear 32 which is in mesh with the retractable driving force input gear 21 is supported by the transfer frame 33 in such a manner that only movement allowed for the driving gear 32 is rotation. Therefore, the movement of the driving force input gear 21 caused by the retraction of the transfer unit 10 is going to be as described above regardless of whether the secondary transfer roller 9 is kept in the contact position or separation position.

As described above, according to this embodiment, the joint 31, and the pivotally movable driving force input gear 21 attached to the conveyance frame 20, are combined. Therefore, not only the secondary transfer roller 9, but also, the transfer frame 33 itself can be separated from the intermediary transfer belt 6. Therefore, even if the image forming apparatus 100 stops while the secondary transfer roller 9 is kept in the contact position by the contact/separation means 30, it is possible to pull the conveyance frame 20 out of the main assembly 110 without damaging the secondary transfer roller 9 and intermediary transfer belt 6.

As described above, in this embodiment, the image forming apparatus 100 is provided with a pressing means 35 which presses the transferring member 9 toward the image bearing member 6. Further, it has the supporting member 33 which supports the transferring member 9 in such a manner that the transferring member 9 can be moved toward, or away from, the image bearing member 6 by the pressing means 35. Further, it has the driving power source 25 which generates the rotational force for rotationally driving the transferring member 9. Moreover, it has a rotatable driving member 32 for transmitting the rotational force from the driving force source 25 to the transferring member 9. Further, it has the joint 31 for transmitting the rotational force from the driving member 32 by connecting the transferring member 9 to the driving member 32 in such a manner that the joint 31 continuously changes in its angle relative to the transferring member 9 and driving member 32. The joint 31 is enabled to transmit the rotational force from the driving member 32 to the transferring member 9 regardless of whether the transferring member 9 is in the first or second position, which are different in the position relative to the driving member 32, and in which the transferring member 9 is moved by being moved relative to the driving member 32. In this embodiment, the image forming apparatus 100 is structured so that the driving member 32 does not change in its position relative to the supporting member 33 (transfer frame 33) in terms of the aforementioned pressing direction. However, even if the image forming apparatus 100 is structured so that the driving member 32 changes its position relative to the supporting member 33, the same effects as those obtainable by this embodiment can be expected as long as the image forming apparatus 100 is structured so that the transferring member 9 is movable relative to the driving member 32. Further, in this embodiment, the driving member 32 is rotatably supported by the supporting member 33. However, the driving member 32 may be attached to a different frame or the like from the supporting member 33. Further, in this embodiment, the image bearing member 6 is an intermediary transferring member which conveys a toner image transferred (primary transfer) onto the image bearing member 6 from the image bearing member 1, onto a sheet P of recording medium, in the area of contact N2 between the image bearing member 6 and transferring member 9. Further, in this embodiment, the transferring member 9 is in the form of a roller.

Further, in this embodiment, the image forming apparatus 100 has the contact/separation mechanism 30 which is capable of placing the transferring member 9 in the contact position (first position) in which the transferring member 9 remains in contact with the image bearing member 6, or the separation position (second position) in which the transferring member 9 remains separated from the image bearing member 6, by moving the transferring member 9 in the direction parallel to the direction in which the transferring member 9 is pressed by the pressing member 35. Further, in this embodiment, the joint 31 is capable of transmitting the rotational force from the driving member 32, to the transferring member 9, regardless of whether the transferring member 9 is kept in the contact position or separation position, by the contact/separation means 30. Further, in this embodiment, the contact/separation means 30 is capable of the placing the transferring member 9 in contact with the image bearing member 6, or separating the transferring member 9 from the image bearing member 6, while the transferring member 9 is rotationally driven. However, all that is necessary is that the contact/separation means 30 is capable of placing the transferring member 9 in contact with the image bearing member 6, separating the secondary transfer roller 9 from the image bearing member 6, or both operations.

Moreover, in this embodiment, the image forming apparatus 100 has the frame 20 which supports the supporting member 33 in such a manner that makes the supporting member 33 movable in the direction which is intersectional to the direction parallel to the rotational axis of the transferring member 9, and the rotatable driving force input gear 21 which inputs the rotational force from the driving force source 25 into the driving member 32. Further, in this embodiment, the driving force inputting member 21 is supported by the frame 20 in such a manner that it is movable in the direction parallel to the rotational axis of the transferring member 9 as the supporting member 33 moves in the direction parallel to the rotational axis of the transferring member 9. In this embodiment, the driving force inputting member 21 is supported by the frame 20 in such a manner that it is allowed to pivotally move. Further, in this embodiment, the driving force source 25 is supported by the frame 20. Further, in this embodiment, the frame 20 can be pulled out of the main assembly 110 of the image forming apparatus 100. Further, in this embodiment, as the frame 20 is pulled out of the main assembly 110, the supporting member 20 moves away from the image bearing member 6 in the direction perpendicular to the rotational axis of the transferring member 9.

Therefore, according to this embodiment, the image forming apparatus 100 is structured to place the secondary transfer roller 9 in contact with the intermediary transfer belt 6, by application of a preset amount of pressure, and yet, can prevent the problem that the pressure of the transferring portion is affected by the inputting of the driving force into the secondary transfer roller 9.

Embodiment 2

Next, one of the other embodiments of the present invention is described. The image forming apparatus in this embodiment is the same in basic structure and operation as the one in the first embodiment. Therefore, the components of the image forming apparatus in this embodiment, and the portions thereof, which are the same in function and/or structure as the counterparts in the first embodiment are given the same referential codes as the counterparts, and are not going to be described.

In the first embodiment, the secondary transferring member was such a roller that directly contacts the intermediary transfer belt 6. In this embodiment, the secondary transferring member comprises an endless belt, and a secondary transfer roller which has a function of a suspending-tensioning roller (support roller) by which the belt is suspended. The image forming apparatus is structured so that the secondary transfer roller is pressed against the intermediary transfer belt 6, with the presence of this endless belt between the secondary transfer roller and the intermediary transfer belt 6.

Figure 9:
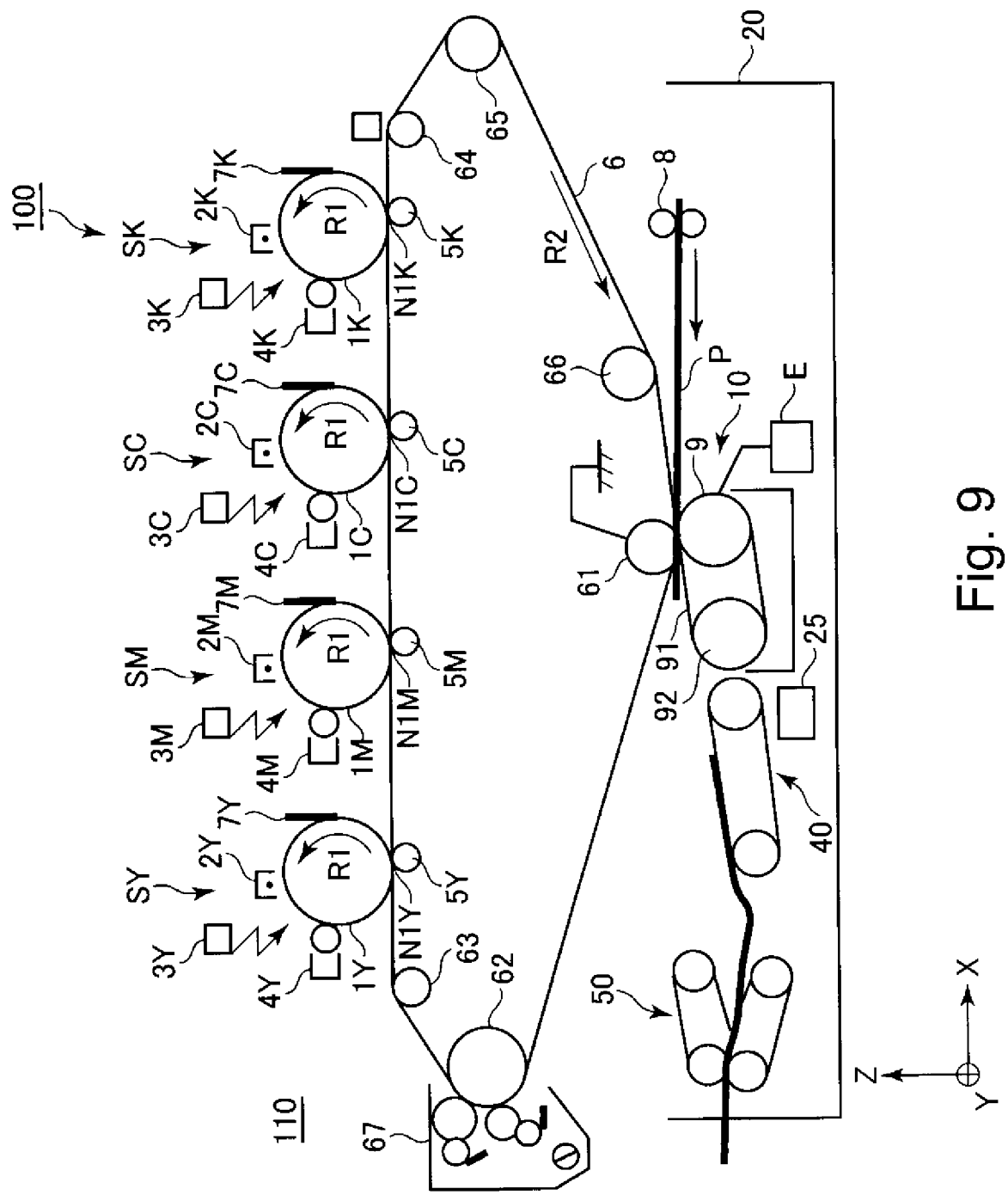
FIG. 9 is a schematic sectional view of another example of image forming apparatus, to which the present invention is applicable.

FIG. 9 is a schematic sectional view of the image forming apparatus 100 in this embodiment. In this embodiment, the transfer unit 10 has a secondary transfer belt 91, and a combination of a secondary transfer roller 9 which functions as a suspension-tension roller which suspends the secondary transfer belt 91 and provides the secondary transfer belt 91 with a present amount of tension, and an idler roller 92 which also functions as a suspension-tension roller. The image forming apparatus 100 is structured so that the secondary transfer roller 9 is pressed against a belt-backing roller 61, with the presence of the secondary transfer belt 91 between itself and the belt-backing roller 61. The secondary transfer roller 9 is rotationally driven by the driving force transmitted thereto from the driving motor 25 as a driving force source. As the secondary transfer roller 9 is rotationally driven, the secondary transfer belt 91 rotates (circularly moves) in the direction (counterclockwise direction) indicated by an arrow mark R3. The idler roller 92 is rotated by the rotation of the secondary transfer belt 91. In this embodiment, the secondary transfer belt 91 is positioned on the outward side the secondary transfer roller 9. The structure and operation of the secondary transfer roller 9 in this embodiment are the same as those of the secondary transfer roller 9 in the first embodiment, although in this embodiment, the secondary transfer belt 91 is positioned on the outward side of the secondary transfer roller 9. As a sheet P of recording medium is conveyed to the secondary transferring portion N2, it is conveyed further by being electrostatically adhered to the surface of the secondary transfer belt 91. Therefore, this embodiment is more stable in the conveyance of the sheet P through the secondary transferring portion N2.

Figure 10:
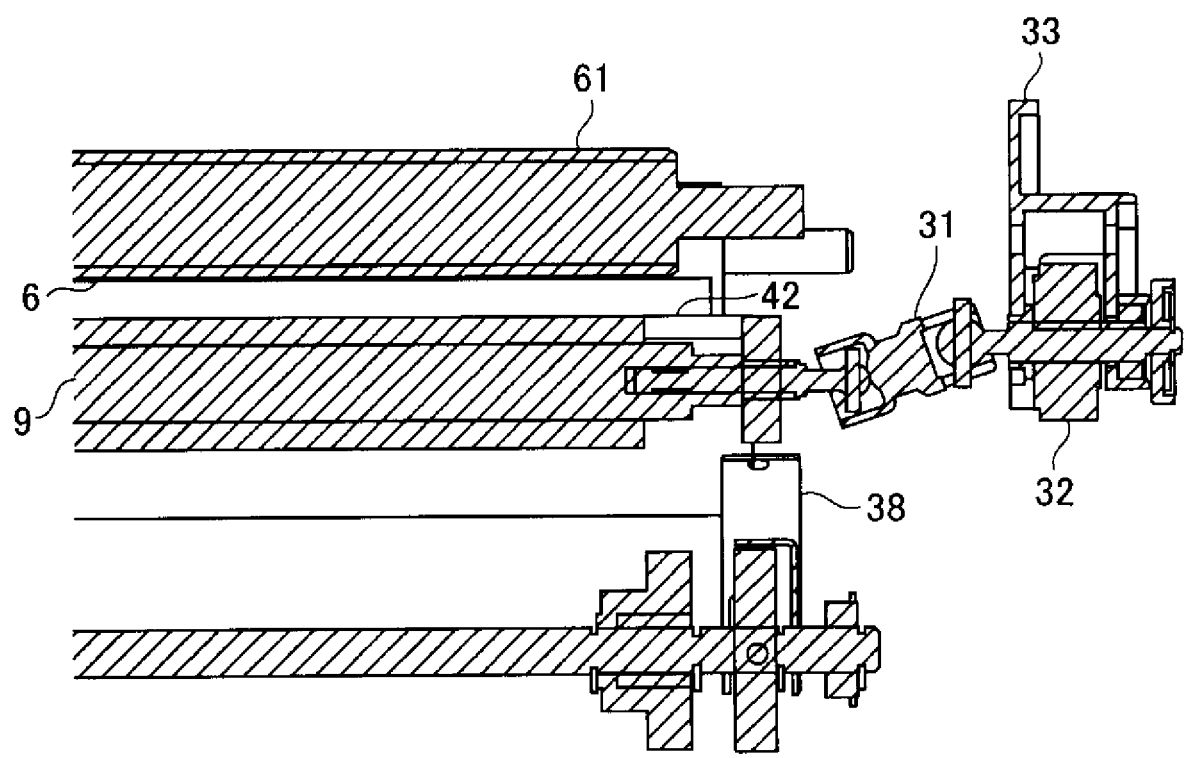
FIG. 10 is a sectional view of one of the lengthwise end portions of the secondary transfer roller and its adjacencies, of the image forming apparatus shown in FIG. 9, at a plane Y-Z, when the secondary transfer roller is in its separation position.
Figure 10:
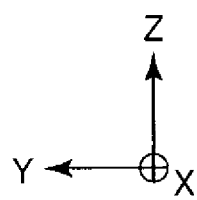
Figure 11:
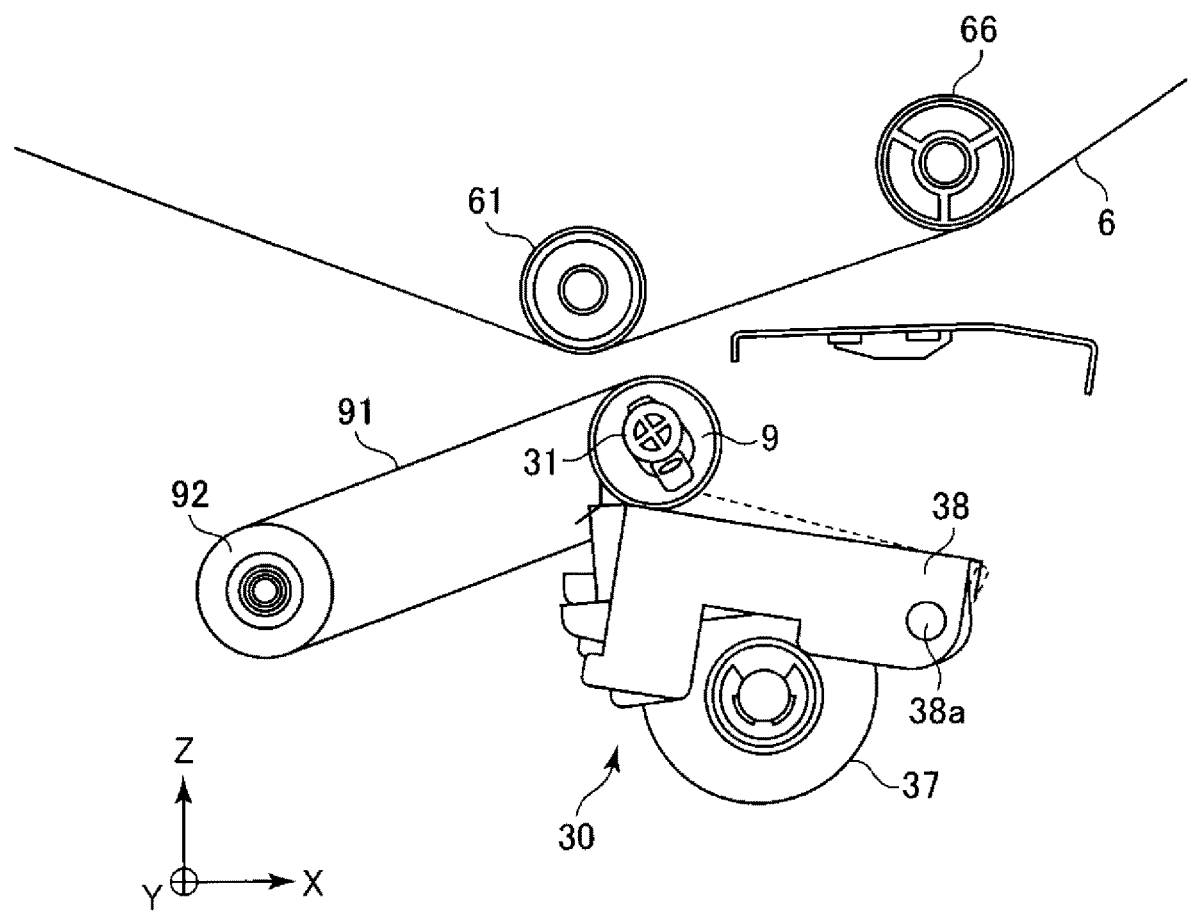
FIG. 11 is a sectional view of one of the lengthwise end portions of the secondary transfer roller and its adjacencies, of the image forming apparatus shown in FIG. 9, at a plane X-Z, when the secondary transfer roller is in its separation position.
Figure 12:
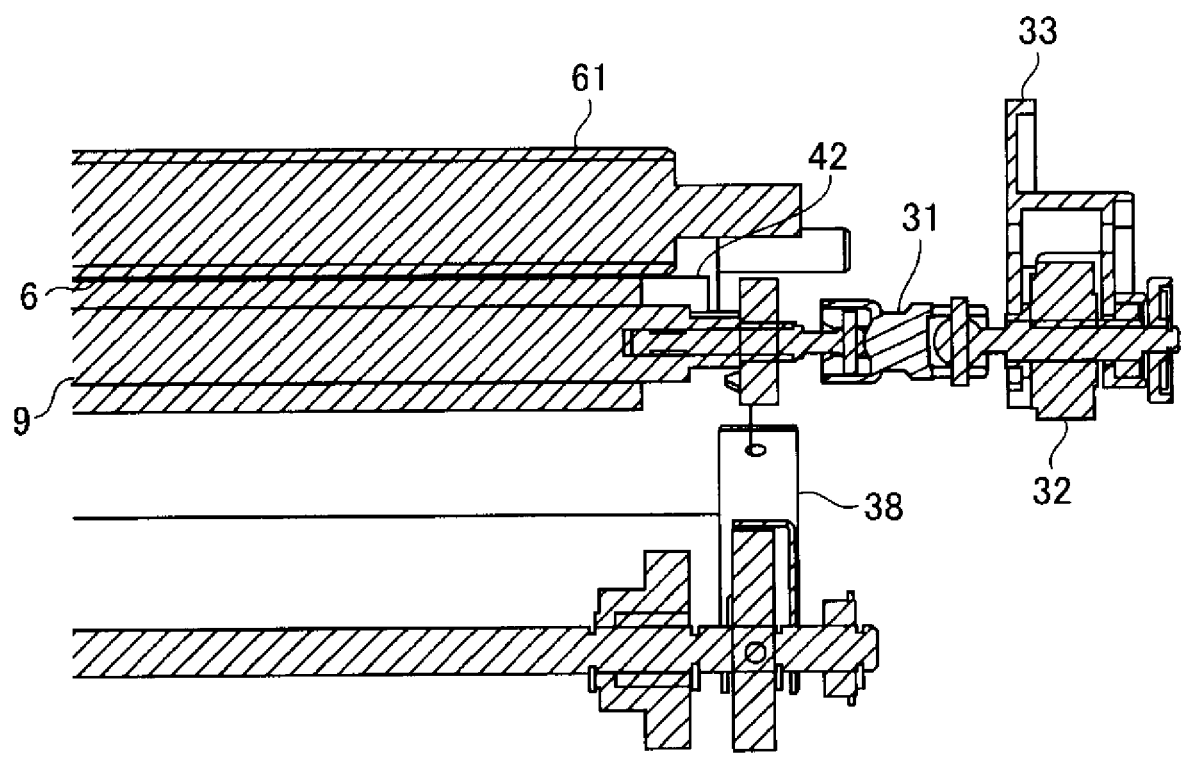
FIG. 12 is a sectional view of one of the lengthwise end portions of the secondary transfer roller and its adjacencies, of the image forming apparatus shown in FIG. 9, at a plane Y-Z, when the secondary transfer roller is in its contact position.
Figure 13:
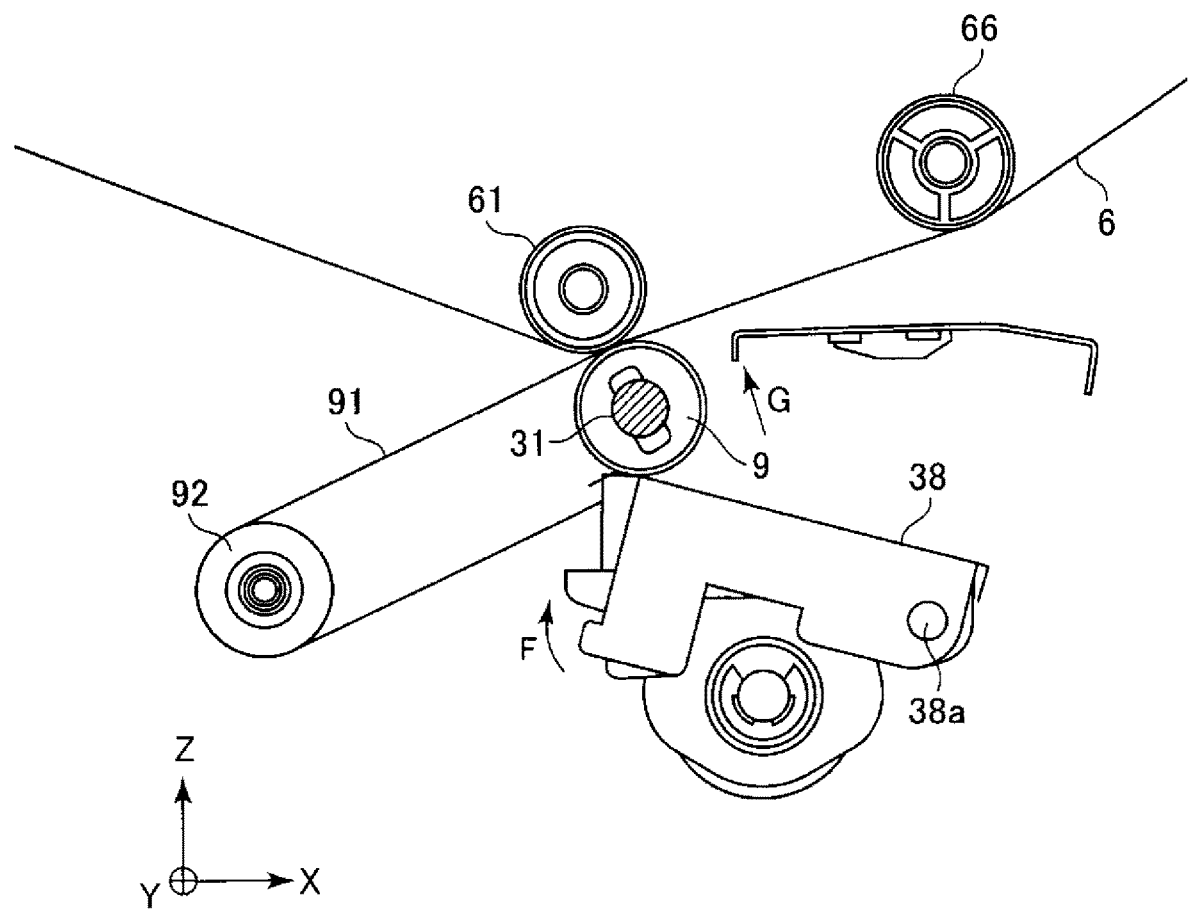
FIG. 13 is a sectional view of one of the lengthwise end portions of the secondary transfer roller and its adjacencies, at a plane X-Z, when the secondary transfer roller is in its contact position.

FIG. 10 is a schematic sectional view (at plane Y-Z) of the one (front) of the lengthwise end portions of the secondary transfer roller 9, and its adjacencies, as seen from the downstream side in terms of the direction in which a sheet P of recording is conveyed. FIG. 11 is a schematic sectional view (at plane X-Z) of one (front) of the lengthwise end portions of the secondary transfer roller 9 and its adjacencies, as seen from the front side in terms of the direction parallel to the rotational axis of the secondary transfer roller 9. FIGS. 10 and 11 show the state of the aforementioned portions, when the secondary transfer belt 91 (and secondary transfer roller 9) is in the separation position in which it is kept by the contact/separation means 30. On the other hand, FIGS. 12 and 13 are similar to FIGS. 10 and 11, respectively, except that in FIGS. 12 and 13, the secondary transfer belt 91 (and secondary transfer roller 9) is in the contact position in which it is being kept by the contact/separation means 30. By the way, all of FIGS. 10-13 show the aforementioned portions of the image forming apparatus 100 in this embodiment, when the transfer unit 10 is in the positioning position.

Referring to FIGS. 10-13, the operation to place the secondary transfer roller 9 in contact with the image bearing member 6, and the operation to separate the secondary transfer roller 9 from the intermediary transfer belt 6, are described.

The secondary transfer belt 91 is rotationally driven by the secondary transfer roller 9. Also, in this embodiment, the secondary transfer roller 9 is in connection to the driving member 32 by way of the joint 31, as in the first embodiment. Further, also in this embodiment, the driving member 32 is supported by the transfer frame 33 in such a manner that the only movement it is allowed is to rotate, as in the first embodiment. Further, in this embodiment, contact/separation means 30 comprises the cam 37, shaft 38a (pivot), and a pressing member 38 which is allowed to pivotally move about the shaft 38a. As the cam 37 rotates, the pressing member 38 is pivotally moved by the cam 37 toward, or away from, the image bearing member 6. The pressing member 38 places the secondary transfer belt 91 (and secondary transfer roller 9) in contact with the image bearing member 6 by pressing the secondary transfer roller 9 toward the image bearing member 6 by pressing on the bearing (unshown) of the secondary transfer roller 9. The aforementioned bearing is movably supported by the transfer frame 33. In this embodiment, as the pressure applied to the secondary transfer roller 9 by the pressing member 38 in the direction to keep the secondary transfer roller 9 pressed toward the image bearing member 6 is removed, the secondary transfer roller 9 is made to pivotally move about the rotational axis of the idler roller 92 by its own weight (or weight of pressing means), in the direction to separate from the image bearing member 6. Further, in order to prevent the problem that while the secondary transfer roller 9 is in the contact position, the pressure of the secondary transferring portion N2 is affected by the thickness of a sheet P of recording medium, frictional wear of the secondary transfer roller 9, and the like factors, the image forming apparatus 100 is structured so that the contact/separation means 30 is allowed to move toward, or away from, the image bearing member 6, in the direction in which the secondary transfer roller 9 (and secondary transfer belt 91) remains pressed by the pressing member 38. That is, in this embodiment, the image forming apparatus 100 is structured so that it is regulated in the contact pressure between the secondary transfer roller 9 (and secondary transfer belt 91) and the image bearing member 6. By the way, as far as the structural arrangement for supporting the secondary transfer roller 9 and moving the secondary transfer roller 9 toward, or away from, the image bearing member 6 is concerned, this embodiment may be the same as the first embodiment.

Referring to FIGS. 10 and 11, prior to the starting of an image forming operation, the secondary transfer belt 91 is kept separated from the image bearing member 6. That is, the secondary transfer roller 9, which is on the inward side of the loop which the secondary transfer belt 91 forms, is kept in the separation position by the contact/separation means 30. As the image forming operation is started, driving force is inputted into the driving roller 62 for the image bearing member 6, and therefore, the image bearing member 6 begins to rotate. Then, the driving force is inputted into the driving member 32, and is inputted into the secondary transfer roller 9 by way of the joint 31. Consequently, the secondary transfer belt 91 is rotationally driven by the rotation of the secondary transfer roller 9. Then, the cam 37 of the contact/separation means 30 rotates, and pushes the pressing member 38 upward (toward image bearing member 6) as shown by an arrow mark F in FIG. 13. As a result, the secondary transfer roller 9 is moved by the pressing member 38 toward the image bearing member 6 by the pressing member 38 in the direction indicated by an arrow mark G in FIG. 13. Consequently, the secondary transfer roller 9 is pressed against the image bearing member 6 with the presence of the secondary transfer belt 91 between itself and secondary transfer roller 9. That is, the secondary transfer roller 9, which is on the inward side of the loop which the secondary transfer belt 91 forms, is placed in the contact position by the contact/separation means 30.

As the image forming operation ends, the cam 37 of the contact/separation means 30 rotates, canceling the pressure applied to the secondary transfer roller 9 by the pressing member 38. Thus, the secondary transfer belt 91 separates from the image bearing member 6. That is, the secondary transfer roller 9, which is on the inward side of the loop which the secondary transfer belt 91 forms, is returned to the separation position by the contact/separation means 30. Thereafter, the driving of the image bearing member 6 and secondary transfer belt 91 is stopped, with the secondary transfer belt 91 (and secondary transfer roller 9) being kept in their separation position.

As described above, according to this embodiment, rotational force is inputted into the movable secondary transfer roller 9 from the driving member 32 which is supported by the transfer frame 33 in such a manner that only movement it is allowed is rotation, by way of the joint 31. Therefore, it is possible to prevent the problem that the pressure of the secondary transferring portion N2 is changed by the inputting of driving force into the driving member 32. That is, it becomes possible to drive the secondary transfer roller 9, without being affected by the problem that the load to which the secondary transfer roller 9 is subjected is changed by the inputting of driving force into the driving member 32. Therefore, it becomes possible to reliably drive the secondary transfer belt 91.

Further, according to this embodiment, it is possible to input rotational force into the secondary transfer roller 9 while the secondary transfer belt 91 is kept in the position in which it is kept in contact with the image bearing member 6 by the contact/separation means 30, or in the position in which secondary transfer roller 9 is kept separated from the image bearing member 6 by the contact/separation means 30. Therefore, it is possible to prevent the problem that as the secondary transfer belt 91 is placed in contact with, or separated from, the image bearing member 6, by the contact/separation means 30, the amount of load to which the image bearing member 6 is subjected changes.

By the way, the structural arrangement for inputting driving force into the driving member 32 in this embodiment is similar to that in the first embodiment. Therefore, also in this embodiment, it is possible to reduce the transfer unit 10 in weight by attaching the driving motor 25, etc., to the conveyance frame 20 as in the first embodiment. Further, by combining the joint 31, and pivotally movable driving force inputting member 21 attached to the conveyance frame 20, not only the secondary transfer roller 9, but also, the transfer frame 33 itself can be separated from the image bearing member 6.

As described above, even if the image forming apparatus 100 is structured so that its transferring member comprises a roller, and a belt supported by the roller in a manner to partially wrap the roller, effects similar to those obtainable by the first embodiment can be obtained.

[Miscellanies]

In the foregoing, the present invention was described with reference to a few of the practical embodiments of the present invention. However, the preceding embodiments are not intended to limit the present invention in scope.

In the embodiments described above, the present invention was applied to the secondary transferring portion of an image forming apparatus of the so-called intermediary transfer type. These embodiments, however, are not intended to limit the present invention in scope. That is, the present invention is also applicable to a transferring portion which directly transfer a toner image from a photosensitive member onto a sheet of recording medium, and the effects of such an application are the same as those obtainable by the embodiments described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-036935 filed on Feb. 28, 2019, which is hereby incorporated by reference herein in its entirety.

What is claimed is:

1. An image forming apparatus comprising:
   an image forming portion including a photoreceptor on which a toner image is formed;
   an intermediate transfer belt to which the toner image is transferred from said photoreceptor;
   a transfer roller which is provided so as to be able to abut against and separate from the outer peripheral surface of said intermediate transfer belt and forms a transfer nip for transferring the toner image onto a recording material;
   an opposing roller provided opposite to said transfer roller with said intermediate transfer belt interposed therebetween and configured to form the transfer nip in cooperation with said transfer roller;
   a driving gear which is provided opposite to said transfer roller in a rotational axis direction of said transfer roller and transmits a driving force to said transfer roller;
   a contact/separation mechanism configured to cause said transfer roller to be placed in contact with and moved away from said intermediate transfer belt; and
   a coupling member provided between said transfer roller and said driving gear with respect to the rotational axis direction of said transfer roller and configured to couple said transfer roller and said driving gear;
   wherein said coupling member is provided with a first connecting portion which is connected to a rotating shaft portion of said transfer roller to rotate said transfer roller and is capable of changing an angle with respect to said rotating shaft portion of said transfer roller, and a second connecting portion which is connected to a rotating shaft of said driving gear, is configured to transmit the driving force from said driving gear to said transfer roller, and is capable of changing an angle with respect to said rotating shaft of said driving gear, and
   wherein said contact/separation mechanism causes said transfer roller to move relative to said driving gear such that said transfer roller is caused to be placed in contact with and moved away from said intermediate transfer belt.

2. An apparatus according to claim 1, wherein said contact/separation mechanism causes said transfer roller to be placed in contact with said intermediate transfer belt in accordance with a start of image forming and to be moved away from said intermediate transfer belt in accordance with an end of the image forming.

3. An apparatus according to claim 2, wherein said coupling member is capable of transmitting the rotational force from said driving gear to said transfer roller irrespective of whether said transfer roller is in a contact position or a spacing position.

4. An apparatus according to claim 3, wherein said contact/separation mechanism causes said transfer roller to be placed in contact with said intermediate transfer belt after driving said intermediate transfer belt and said transfer roller in accordance with the start of the image forming.

5. An apparatus according to claim 1, further comprising an intermediate transfer unit configured to support said intermediate transfer belt;
   a transfer unit configured to support said transfer roller and said driving gear;
   a frame body movably supporting said transfer unit in a direction crossing the rotational axis direction of said transfer roller, wherein said frame body is constituted so as to be drawn out along the rotational axis direction of said transfer roller;
   a motor provided in said frame body to drive said transfer roller; and
   a drive input member movably provided on said frame body and drivingly connected to said driving gear,
   wherein said transfer unit is positioned with respect to said intermediate transfer unit when said frame body is in a mounting position, and
   wherein said transfer unit is moved in the direction crossing the rotational axis direction of said transfer roller when said frame body is pulled out, and said drive input gear is movable in a direction crossing the rotational axis direction of said transfer roller with the movement of said transfer unit.

6. An apparatus according to claim 5, wherein said drive input member is swingably supported by said frame body.

7. An apparatus according to claim 1, wherein said coupling member is engaged with said rotating shaft portion of said transfer roller by a first engagement portion and a second engagement portion, said first engagement portion is provided on the opposite side of said second engagement portion with respect to the rotation center of said transfer roller, said coupling member is engaged with said rotating shaft portion of said driving gear by a third engagement portion and a fourth engagement portion, and said third engagement portion is provided on the opposite side to said fourth engagement portion with respect to the rotation center of said driving gear.

8. An apparatus according to claim 1, further comprising a spring configured to press said transfer roller toward said opposing roller;
   wherein said transfer roller is automatically changed in position as the recording material passes through the transfer nip.

* * * * *